(12) United States Patent
Grabert

(10) Patent No.: US 7,133,022 B2
(45) Date of Patent: Nov. 7, 2006

(54) APPARATUS FOR IMAGE PROJECTION

(75) Inventor: Michael Grabert, Austin, TX (US)

(73) Assignee: Keyotee, Inc., Austin, TX (US)

( * ) Notice: Subject to any disclaimer, the term of this patent is extended or adjusted under 35 U.S.C. 154(b) by 275 days.

(21) Appl. No.: 10/288,914

(22) Filed: Nov. 6, 2002

(65) Prior Publication Data

US 2003/0085867 A1 May 8, 2003

Related U.S. Application Data

(60) Provisional application No. 60/333,266, filed on Nov. 6, 2001, provisional application No. 60/333,178, filed on Nov. 6, 2001.

(51) Int. Cl.
*G09G 5/00* (2006.01)

(52) U.S. Cl. .................... 345/156; 345/44; 345/88; 345/173

(58) Field of Classification Search .............. 345/6, 345/1.1, 204, 30, 87, 85, 84, 102, 4, 173, 345/88
See application file for complete search history.

(56) References Cited

U.S. PATENT DOCUMENTS

| | | | |
|---|---|---|---|
| 3,621,133 A | 11/1971 | Baker et al. ............... 348/205 |
| 3,853,658 A | 12/1974 | Ney .......................... 156/180 |
| 4,241,343 A | 12/1980 | Fan et al. .................. 340/755 |
| 4,533,215 A | 8/1985 | Trias et al. ................ 350/347 |
| 4,654,716 A | 3/1987 | Zimmerman ............... 358/237 |
| 4,833,528 A | 5/1989 | Kobayashi ................. 358/53 |
| 5,092,664 A | 3/1992 | Miyatake et al. .......... 359/41 |
| 5,136,426 A | 8/1992 | Linden et al. ............. 359/583 |
| 5,255,082 A | 10/1993 | Tamada ...................... 358/60 |
| 5,260,570 A | 11/1993 | Nakamura et al. ......... 250/235 |
| 5,317,348 A | 5/1994 | Knize ......................... 353/31 |
| 5,440,352 A | 8/1995 | Deter et al. ................ 348/750 |
| 5,517,263 A | 5/1996 | Minich et al. .............. 353/31 |
| 5,565,882 A | 10/1996 | Takanashi et al. .......... 345/32 |
| 5,572,363 A | 11/1996 | Fergason ................... 359/630 |

(Continued)

FOREIGN PATENT DOCUMENTS

EP 0 139 991 8/1984

(Continued)

OTHER PUBLICATIONS

Tuantranont, Adisorn, et al., "Optical Beam steering using MEMS-controllable microlens array," Sensors and Actuators A 91 (2001), vol. 91, No. 3, Jul. 15, 2001, pp. 363-372, XP004255490.

(Continued)

*Primary Examiner*—Sumati Lefkowitz
*Assistant Examiner*—Tammy Pham
(74) *Attorney, Agent, or Firm*—Hulsey Intellectual Property Lawyers, P.C.

(57) ABSTRACT

The invention is directed to a solid-state projection device incorporating a light source, modulator, and control circuitry on a single chip. For example, projection device may include several sets of VCSELs, each associated with a set of MEMs mirrors and coupled to a control circuitry. The device may also include various Pyrex layers for sealing and angling layers. The device may further include detectors associated with the light source. These detectors may be useful in determining the shape and location of the projection surface, building a gesture interface, and determining the operability of proxels. The invention is also directed to methods for using the device for manipulating the image, producing zoom, masking, reverse images, positioning, and keystone correction, among others. The invention may be used in projection display devices, portable display devices, heads-up displays, retinal displays, rear and front projection displays, and other display applications.

7 Claims, 18 Drawing Sheets

U.S. PATENT DOCUMENTS

| | | | |
|---|---|---|---|
| 5,574,579 A | 11/1996 | Molteni et al. | 359/23 |
| 5,585,960 A | 12/1996 | Sato et al. | 359/290 |
| 5,625,636 A | 4/1997 | Bryan et al. | 372/50 |
| 5,629,806 A | 5/1997 | Fergason | 359/630 |
| 5,663,815 A | 9/1997 | Molteni et al. | 359/13 |
| 5,668,611 A | 9/1997 | Ernstoff et al. | 348/771 |
| 5,668,907 A | 9/1997 | Veligdan | 385/120 |
| 5,700,076 A | 12/1997 | Minich et al. | 353/31 |
| 5,729,386 A | 3/1998 | Hwang | 359/618 |
| 5,747,363 A | 5/1998 | Wei et al. | 438/5 |
| 5,751,263 A | 5/1998 | Huang et al. | 345/82 |
| 5,760,931 A | 6/1998 | Saburi et al. | 359/13 |
| 5,777,312 A | 7/1998 | Hanson | 235/462 |
| 5,777,706 A | 7/1998 | Chen et al. | 349/74 |
| 5,778,018 A | 7/1998 | Yoshikawa et al. | 372/45 |
| 5,781,229 A | 7/1998 | Zediker et al. | 348/51 |
| 5,785,404 A | 7/1998 | Wiese | 362/32 |
| 5,802,222 A | 9/1998 | Rasch et al. | 381/1 |
| 5,814,841 A | 9/1998 | Kusuda et al. | 257/113 |
| 5,825,338 A | 10/1998 | Salmon et al. | 345/7 |
| 5,826,959 A | 10/1998 | Atsuchi | 353/20 |
| 5,875,108 A | 2/1999 | Hoffberg et al. | 364/146 |
| 5,898,511 A | 4/1999 | Mizutani et al. | 359/13 |
| 5,901,246 A | 5/1999 | Hoffberg et al. | 382/209 |
| 5,903,323 A | 5/1999 | Ernstoff et al. | 348/771 |
| 5,914,807 A | 6/1999 | Downing | 359/326 |
| 5,943,354 A | 8/1999 | Lawandy | 372/39 |
| 5,949,331 A | 9/1999 | Schofield et al. | 340/461 |
| 5,956,172 A | 9/1999 | Downing | 359/326 |
| 5,990,983 A | 11/1999 | Hargis et al. | 348/758 |
| 6,005,714 A | 12/1999 | Welch | 359/576 |
| 6,029,073 A | 2/2000 | Lebby et al. | 455/566 |
| 6,037,603 A | 3/2000 | Nelson | 257/14 |
| 6,046,714 A | 4/2000 | Lim | 345/81 |
| 6,079,833 A | 6/2000 | Kaelin et al. | 353/31 |
| 6,115,058 A * | 9/2000 | Omori et al. | 348/45 |
| 6,115,618 A | 9/2000 | Lebby et al. | 455/566 |
| 6,121,983 A | 9/2000 | Fork et al. | 347/134 |
| 6,131,017 A | 10/2000 | Lebby et al. | 455/73 |
| 6,137,456 A * | 10/2000 | Bhagavatula et al. | 345/7 |
| 6,140,979 A | 10/2000 | Gerhard et al. | 345/7 |
| 6,141,432 A | 10/2000 | Breed et al. | 382/100 |
| 6,151,167 A | 11/2000 | Melville | 359/618 |
| 6,154,479 A | 11/2000 | Yoshikawa et al. | 372/96 |
| 6,163,313 A * | 12/2000 | Aroyan et al. | 345/173 |
| 6,172,778 B1 | 1/2001 | Reinhorn et al. | 359/15 |
| 6,175,440 B1 | 1/2001 | Conemac | 359/204 |
| 6,188,460 B1 | 2/2001 | Faris | 349/176 |
| 6,188,466 B1 | 2/2001 | Iwasa | 355/70 |
| 6,208,349 B1 | 3/2001 | Davidson | 345/427 |
| 6,210,008 B1 | 4/2001 | Hoekstra et al. | 359/603 |
| 6,222,868 B1 | 4/2001 | Ouchi et al. | 372/50 |
| 6,239,453 B1 | 5/2001 | Yamada et al. | 257/79 |
| 6,239,828 B1 | 5/2001 | Ito et al. | 347/241 |
| 6,239,829 B1 | 5/2001 | Curry | 347/251 |
| 6,245,590 B1 | 6/2001 | Wine et al. | 438/52 |
| 6,252,638 B1 | 6/2001 | Johnson et al. | 349/5 |
| 6,256,131 B1 | 7/2001 | Wine et al. | 359/199 |
| 6,257,739 B1 | 7/2001 | Sun et al. | 362/285 |
| 6,259,548 B1 | 7/2001 | Tsugai et al. | 359/224 |
| 6,259,559 B1 | 7/2001 | Kobayashi et al. | 359/485 |
| 6,264,331 B1 | 7/2001 | Sawai et al. | 353/31 |
| 6,285,489 B1 | 9/2001 | Helsel et al. | 359/291 |
| 6,309,071 B1 | 10/2001 | Huang et al. | 353/31 |
| 6,317,170 B1 | 11/2001 | Hwang et al. | 348/750 |
| 6,324,007 B1 | 11/2001 | Melville | 359/618 |
| 6,339,506 B1 | 1/2002 | Wakelin et al. | 359/648 |
| 6,657,607 B1 * | 12/2003 | Evanicky et al. | 345/88 |
| 2001/0030642 A1 | 10/2001 | Sullivan et al. | |
| 2004/0001033 A1 * | 1/2004 | Goodwin-Johansson et al. | |
| 2004/0212550 A1 * | 10/2004 | He | |

FOREIGN PATENT DOCUMENTS

| | | |
|---|---|---|
| EP | 0 524 210 B1 | 12/1995 |
| EP | 0 528 646 B1 | 10/1996 |
| EP | 0 458 270 B1 | 11/1996 |
| EP | 0 771 121 A2 | 5/1997 |
| EP | 0 710 423 B1 | 12/1998 |
| EP | 0 650 301 B1 | 5/2000 |
| EP | 0 786 149 B1 | 7/2000 |
| EP | 0 746 947 B1 | 10/2001 |
| EP | 0 886 802 B1 | 11/2001 |
| WO | WO 02/17017 A1 | 2/2002 |
| WO | WO 02/17018 A3 | 2/2002 |

OTHER PUBLICATIONS

Fruehauf et al., "Liquid Crystal Digital Scanner-Based HMD," Proceedings of SPIE vol. 4021, *Helmet- and Head-Mounted Displays*.

Hornbeck, "A Digital Light Processing™ Update—Status and Future Applications," SPIE vol. 3634.

Hornbeck, "Projection Displays and MEMS: Timely Convergence for a Bright Future," SPIE vol. 2639.

Horsky et al., "Electron-Beam-Addressed Membrane Mirror Light Modulator for Projection Display," *Applied Optics*, vol. 31, No. 20, Jul. 10, 1992.

Huang et al., "Spontaneous Lifetime and Quantum Efficiency in Light Emitting Diodes Affected by a Close Metal Mirror," IEEE Journal of Quantum Electronics, vol. 29, No. 12, Dec. 1993.

Hwang et al., "Compact Hybrid Video Color Mixer for Large-Area Laser Projection Display," SPIE Conference on Current Developments in Optical Design and Engineering VII, San Diego, Ca, Jul. 1998.

Marlor, "Next Generation Photoactivated Light Valve Projection Systems," SPIE vol. 2407.

Pryor et al., "The Virtual Retinal Display: A New Display Technology Using Scanned Laser Light," Proceedings of The Human Factors and Ergonomics Society, 42nd Annual Meeting, 1998.

* cited by examiner

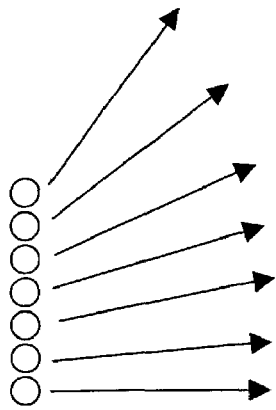
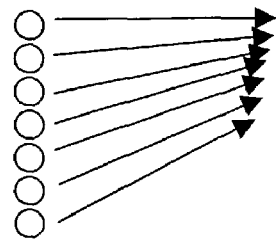
Figure 7A  Figure 7B
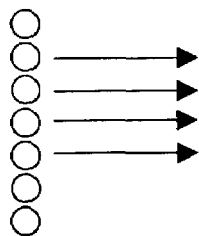
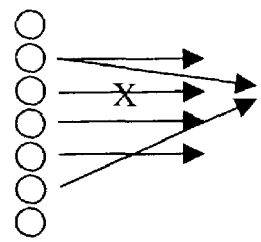
Figure 7C  Figure 7D
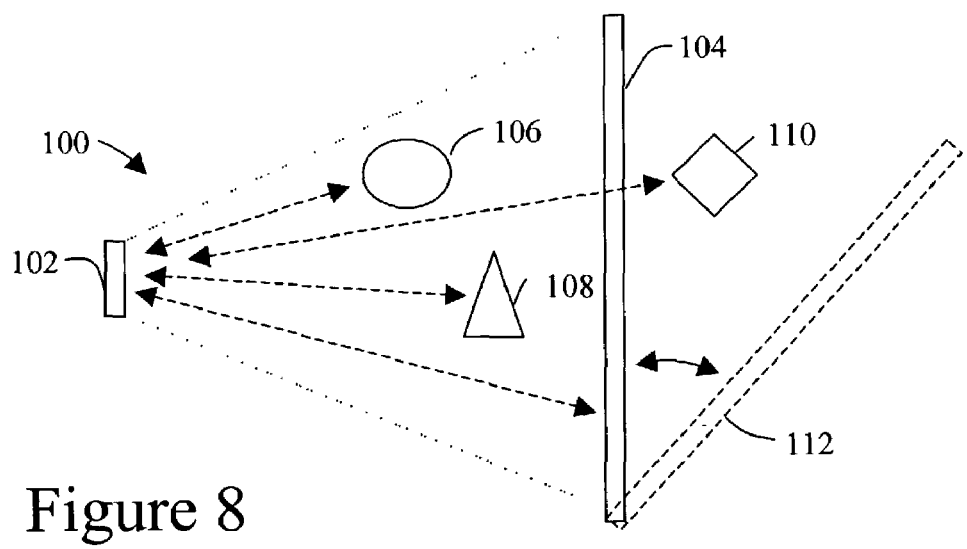
Figure 8

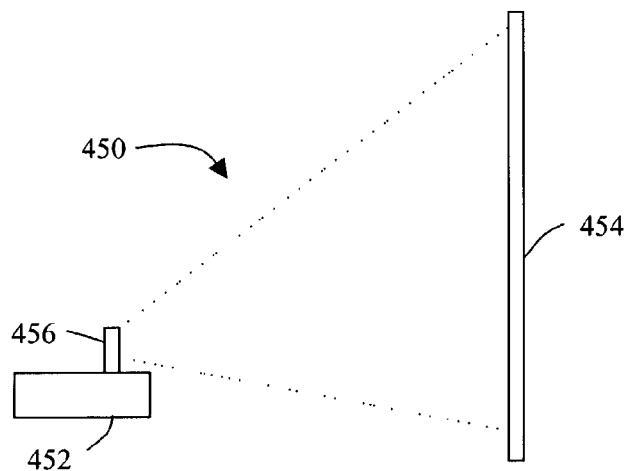
Figure 19A
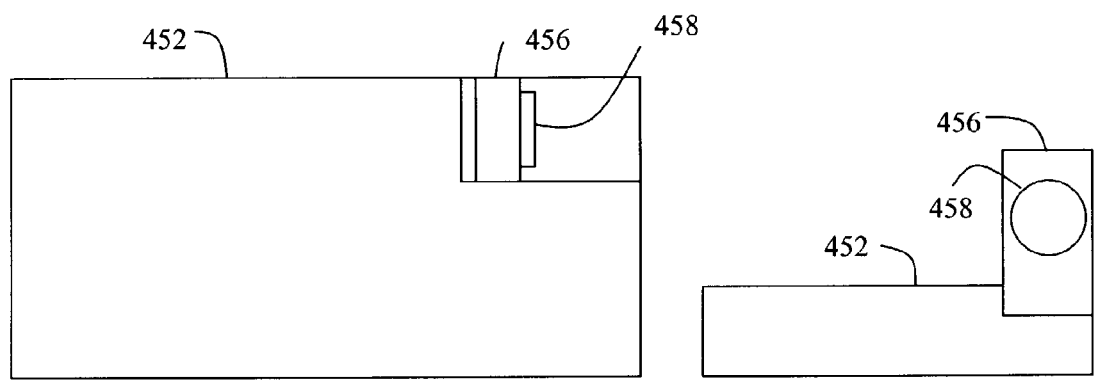
Figure 19B
Figure 19D
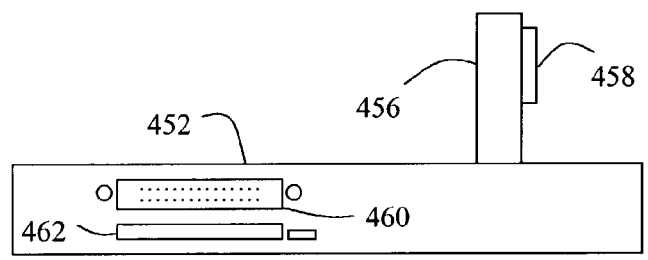
Figure 19C

APPARATUS FOR IMAGE PROJECTION

CROSS-REFERENCE TO RELATED APPLICATIONS

This application claims the benefit of priority of U.S. Provisional Application, No. 60/333,266, filed Nov. 6, 2001 entitled "APPARATUS FOR PROJECTION DISPLAY", and is incorporated herein by reference in its entirety.

This application claims the benefit of priority of U.S. provisional Application, No. 60/333,178, filed Nov. 6, 2001 entitled "APPARATUS FOR IMAGE PROJECTION", and is incorporated herein by reference in its entirety.

TECHNICAL FIELD

The present invention relates to portable projection devices. Specifically, the present invention relates to portable projection devices operable to display images.

BACKGROUND OF THE INVENTION

Business and other functions are moving to a mobile paradigm. With the expanding use of portable computing devices and portable devices include laptops, cellular phones, and PDAs, among others, many typical portable display and portable projection devices are available. However, typical display technologies are cumbersome, have low quality, and have a high power consumption.

Many typical projection devices are large projection devices designed to be connected to a computer, often a desktop computer. With the proliferation of laptop computers, the market has expanded as the projection devices became more portable. Recently, vendors have developed devices that enable a PDA, such as a Palm or Pocket PC device, to be connected to a projector and drive a presentation, eliminating the need for a laptop computer. Likewise, many high-end projectors include the ability to store and display Powerpoint files without an external device. The typical user of these projectors is the corporate user for the presentation purposes, but the market is expanding to home theatre, specialty displays, and training simulation applications.

Display projection systems are typically large, heavy and power hungry devices. They require high-power and high-temperature light sources to work. This means they also require significant cooling and power supplies. Also, current devices require fairly complex optics to focus and manipulate the display for "keystone correction" and zoom, among other features. Manual correction of the display is required to accommodate environmental issues. Typical devices are shrinking through the use of smaller components, but essentially the technologies used are old. The problems of high-power, large size, durability, and usability remain. These typical display technologies include CRTs, LCDs, Plasma Displays, and Light Valve or DLP® Projectors.

Many typical portable projectors are the size of a large laptop in width and depth but often twice the height of many typical laptops. One typical unit is 1.9" h×9"×7" weighing 2.9 pounds. This devise is based on the TI DLP® (Digital Light Processor) technology, outputs 800 ANSI Lumens (a measure of display brightness), and supports XGA (1024× 768) resolution. Many typical products range in price from $3000 to $10000 depending on features, brightness, and resolution.

Size and weight reductions are limited utilizing current technology. Fragile, power hungry, and expensive bulbs are required to be precisely assembled with precision optical components to make current devices. This keeps manufacturing costs high and margins low. The current devices are relegated to special use and only one or two per location are owned by a typical business. Although somewhat portable at 3 pounds, the current devices require bulb replacements every 200 or so hours of use at a cost of $200–$300.

Often, projector brightness is measured in ANSI Lumens. In projector specification sheets this measurement is labeled "brightness" but technically is a measure of luminant power. Lumens are a measure of the quantity of light, not illumination or brightness. To determine brightness, the number of lumens are divided by the area to get Lumens/sq.ft.

The specification for ANSI lumen measurement of projectors is independent of projected image size, and uses measurement from nine points around the screen to come up with an average value. Many typical display projectors are rated at between 800–1100 ANSI Lumens.

In contrast, a typical television picture has a brightness of about 20–30 Lumens/sq.ft. Comparison to an 800 ANSI lumen projector depends on the size of the displayed image. Remember, to get the brightness we divide the lumens rating by the display area. An 800 lumen projector is about as bright as a typical TV for a display size of 7½ feet assuming that the screen is not absorbing too much light.

The brightness of a typical 800 lumen projector on a screen to create a 7½ ft diagonal image (which covers 27 sq. ft.) is 30 lumens/sq. ft. (dividing 800 lumens by 27 sq. ft.). For a larger display, the image is less bright. For example, a 10 ft. diagonal size image (covers 48 sq. ft.), the same projector will have a brightness of 17 lumens/sq. ft. (800/ 48=17)

Many typical projectors are either LCD (Liquid-Crystal-Display) or DLP® (Digital Light Processor) projectors. Both type projectors use a high-intensity lamp that burns at a constant brightness. Each pixel of the LCD panels inside acts as a tiny shutter to block some of that light and vary the brightness on the screen. DLP® projectors have an array of the tiny mirrors and the light is either aimed through the lens onto the screen or aimed at a black "light sink" in the projector to absorb the unneeded light. Whether one pixel or all pixels are transmitting maximum light the bulb brightness will not vary. (Because the LCD Pixels cannot completely block the light, and DLP® projectors leak light even when the pixel's mirror is pointing toward the light sink, both types of projectors typically produce a less than perfect black.)

A 100 W light bulb puts out only 5–7 W of visible light, the rest of the energy is wasted in heat. The 100 W bulb emits the equivalent of about 800 lumens, but a projector that outputs 800 lumens typically requires a 250 W bulb. This is because the bulb outputs light in all directions. Imperfections in the reflector, leakage of light, and the light absorbed going through the LCD panel and the lenses waste about half of the luminous intensity before it leaves the projector. Also, some light is lost in dispersion as it crosses the room to the screen. Getting the light from the bulb to the screen wastes a lot of energy.

To get a very "white" color from a bulb the filament must operate at a high temperature which requires higher voltages and a much larger power supply. This also increases the power lost as heat.

The difference between many typical projectors and many typical televisions is the projection method. In a television CRT (Cathode-Ray-Tube), light is created by a focused beam of electrons hitting the phosphor on the inside of its face. The beam illuminates a very small point and moves that point rapidly across the faces from left to right, top to bottom until it covers the whole surface. This takes place rapidly so the eye doesn't notice and sees the picture as one solid image.

The electron beam intensity is varied as needed to change the brightness of the dot. The primary limitation of brightness in a CRT is its maximum beam current. The average power required to create a complete picture is much lower. If only 10% of the screen needs to be at maximum brightness, then maximum power is required for only 10% of the time. For a scanning type display two measurements are needed, average power (the equivalent to ANSI lumens) and peak power. The average power can be much lower for the same quality picture because it is rarely required that the whole screen be white.

There are CRT based projectors, which typically use 3 very bright CRTs, focused through lenses to project an image. However, they are heavy and large. CRTs are sometimes still used for rear-projection TVs. The peak to average (ANSI) lumens ratio of CRT projectors is typically five to one. For example, a 160 ANSI lumen rated CRT projector will have over 800 peak lumens. Since CRTs can completely cut off the beam current, CRTs can provide a perfect black level. A clean black is just as important to picture quality as a bright white. Because of the basic difference, a CRT projector with a typical, 160-lumen ANSI brightness and 800-plus peak brightness, will actually look brighter than an LCD projector rated at 800 lumens.

Early computer monitors (green screens) could not scan the number of lines required often enough, (at a high-enough refresh rate) so they had phosphors with more persistence. (i.e. they glowed longer after the electron beam hit them.) High persistence phosphors were required to overcome limitations of the electronics and are designed to improve display quality when the device cannot scan fast enough.

All phosphors have some persistence, which is unavoidable. Paradoxically, as display electronics got faster and could drive the beam more quickly (i.e. higher refresh rates), CRT manufacturers have had to work to minimize the persistence of the phosphors in CRTs. Computer monitors have increasingly used lower persistence phosphors at higher refresh rates so they get less image flicker and crisper images of moving pictures like video.

In addition to the display issues, connection to devices may prove problematic. Typical display devices for laptops use connections that are not available for other portable computing devices. Cross compatibility is limited and multiple display devices must be used for multiple portable devices.

These problems persist in many display arenas including heads-up displays, gauge displays, rear projection televisions, front projection televisions, computer monitors, cell phone screens, PDA screens, portable projection devices, and photocopier imaging, among others. As such, this solution may be applied to a variety of display applications.

As such, many typical display devices suffer from the display capabilities, interface formats, and portability. Further, many typical displays are bulky, heavy, expensive, high power consumers, high heat producers, mechanically complex, difficult to setup, and/or fragile, among others. Many other problems and disadvantages of the prior art will become apparent to one skilled in the art after comparing such prior art with the present invention as described herein.

BRIEF SUMMARY OF THE INVENTION

Aspects of the invention are found in a single light projecting unit having at least one substrate layer. The unit may have a substrate layer with several electromagnetic energy sources, a substrate layer with several micro-electromechanical mirrors, and a substrate layer with computational circuitry. Each micro-electromechanical mirror may be uniquely associated with a set of electromagnetic energy sources. Further, the computation circuitry may drive the electromagnetic energy sources and the micro-electromechanical mirrors to produce an image. The electromagnetic energy sources may comprise microlasers, nanodots, and VCSELs, among others. The set of electromagnetic energy source may include a red, blue, and green light source. In addition, the set of electromagnetic energy sources may include infra-red sources, among other sources. Integrated with the substrate layers may be transparent layers. These layers may be used as wedges to aid in directing light or to seal sensitive components.

Further aspects of the invention may be found in a proxel unit. The proxel unit may have a set of electromagnetic energy sources, each emitting a different wavelength. This set of energy sources is associated with an electromagnetic energy modulator with which light emitted from the energy sources is directed. A group of these proxel units may be combined in a single chip-like unit to facilitate the projection of images. The differing wavelengths may include red, blue, green, and infrared, among others. Further the electromagnetic energy source may be nanodots, VCSELs, light emitting diodes, and microlasers, among others. The electromagnetic energy modulator may be a micro-electromechanical mirror. In addition, the proxel unit may include a light detector. Such a light detector may be used to determine mirror position, operability, calibration, and proximity of objects, among others.

Additional aspects of the invention may be found in a projection apparatus including a substrate with several light sources, a first modulator substrate with several micro-electromechanical mirrors, and a second substrate with micro-electromechanical mirrors. These may all be integrated with a computation circuitry into a single chip-like unit. The unit may further include transparent layers integrated with the substrate layers. The transparent layers may be used as wedges to aid in directing light or for sealing and protecting sensitive parts.

Other aspects of the invention are found in a method for using an integrated projection unit with a plurality of proxels. The method includes, adjusting the range or data assigned to an individual proxel and directing the emitting of light to coordinate with one or more light modulators to produce an image.

As such, a apparatus for image projection is described. Other aspects, advantages and novel features of the present invention will become apparent from the detailed description of the invention when considered in conjunction with the accompanying drawings.

BRIEF SUMMARY OF DRAWINGS

For a more complete understanding of the present invention and advantages thereof, reference is now made to the following description taken in conjunction with the accompanying drawings in which like reference numbers indicate like features and wherein:

FIGS. 7A, 7B, 7C, and 7D are diagrams depicting projection attributes, according to the invention;

FIG. 8 is a schematic block diagram depicting the sensing of light reflected from objects about the field of view of the projection device;

FIGS. 17, 18, 19A, 19B, 19C, 19D, 20, 21, 22 and 23 are schematic diagrams depicting exemplary applications for a projection device as seen in FIGS. 1, 2 and 3.

DETAILED DESCRIPTION OF THE INVENTION

The invention is related to the creation of portable display devices based on a projection device with integrated light sources and light modulation devices. One possible application includes a basic scanning projection system. Other exemplary applications include a heads-up display, a rear projection display, a gesture interface, and copiers, among others.

The light source and light modulation devices may be integrated into a single unit or light projection apparatus. This unit may comprise several optically coupled layers. In addition, the unit may comprises computational circuitry electrically coupled to the light source and light modulation devices. As such, the layers may be semiconductor layers integrated with other materials to form a single chip-like unit. The unit may take a chip-like form and be made with various semiconductors, substrates, and hybrid semiconductor layers, among others. The single chip-like unit may project light from various subunits, termed proxels, to produce an image.

Figure 1:
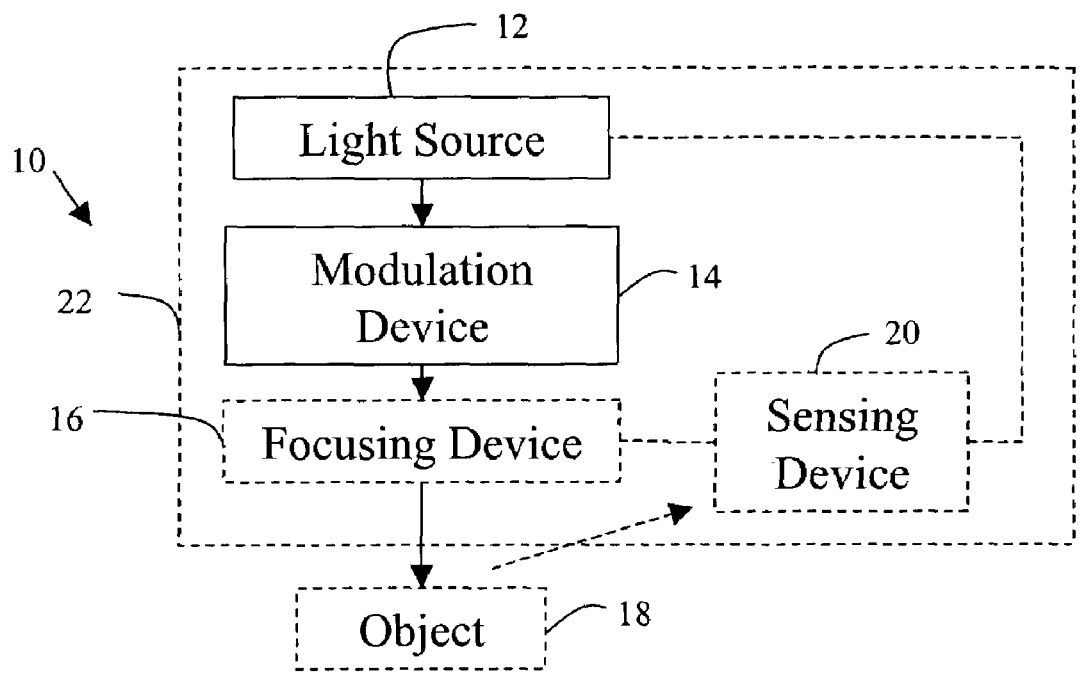
FIG. 1 is a schematic block diagram depicting a projection device according to the invention.

FIG. 1 is schematic block diagram of a system 10 for image projection according to the invention. A light source 12 generates an electromagnetic signal that impinges on a modulation device 14. The modulation device 14 directs the electromagnetic signal from the device 22. The electromagnetic signal may be directed through a focusing device 16. The electromagnetic signal may be directed to impinge on a specific object 18. In addition, a sensing device 20 may detected scattered electromagnetic signals and use those electromagnetic signals to control the light source 12, the modulation device 14, and/or the focusing device 16.

These devices may be located in separate units, on a single substrate, or in various other combinations. For example, a VCSEL device and a MEM mirror may be located on a single substrate. The VCSEL may generate a beam. The beam may impinge on the mirror. The mirror may direct the beam to a screen or other display. Further, a light sensor may be included on the device. The reflected light may be detected and measured to determine the distance of reflecting objects or other qualities of the reflected light.

Semiconductor light source technologies may take various forms. These forms may include, LEDs, RC LEDs, NRC LEDs, surface LEDs, thin film LEDs, OLEDs, VCSELS, EELs, tunable multi-color lasers, diode laser, and nanodots, among others.

The modulation device may take various forms. These forms may include digital light processors, oscillating MEMs mirrors, image correcting piston mirror arrays, nano- or micro-translators with mirrors, stationary mirrors, liquid crystal cells, devices with variable reflectivity, and other spatial light modulators, to name a few. In addition, spatial light modulators may be amplitude and/or phase modulators. These, among others, may be used in the invention.

The invention may use a digital signal processor. This processor may act to control, manipulate, and/or communicate with the semiconductor light emitter technology and/or the modulation devices. Further, the invention may function to direct electromagnetic energy produced by the semiconductor light emitter technology with the modulation device under the instruction of the digital signal processor. Further, the digital signal processor may communicate with a computing device, including a portable computing device, among others.

In one exemplary embodiment, the invention may take the form of a scanned projecting display. The display may use MEM-based mirrors and semiconductor light source array integrated on a single chip. The MEM-based mirrors and semiconductor light sources are grouped into "Proxel" elements. Each "Proxel" element has one or more light sources and one or more modulation devices. Proxel elements may be arranged on the integrated device to facilitate functionality such as electronic zoom, masking, and keystone correction, among others. As such, the system will be extremely durable, consume less power, and be matchbook size. In addition, the resolution and size of the projected image may not be limited by the device size and yields will not be susceptible to pixel errors. As such, it can function as a personal display or group projector.

In another embodiment, the scanned projecting display may have MEM-based mirrors, semiconductor light source array and LiDAR imaging array integrated on a single chip. The LiDAR may be used to track display surface to control display size and enable distortion correction, track user movements for gesture-based user interface, and/or scan user provided objects (2D or 3D) for input.

In a further embodiment, the integrated device combines one or more oscillating mirrors with VCSELs in Proxel elements. The device projects dots associated with the Proxels on to the screen and moves them rapidly to create a picture. This differs from the traditional approach of modulating of light with a spatial light modulator such as a single DLP® or LCD directed through a lens. Instead it is more similar to a TV. In a television, in order to create an electron beam, the cathode must be enclosed in a vacuum and heated to fairly high temperatures. Then the beam hits the phosphors on the face of the screen, creating a dot of light. By contrast, the semiconductor light source converts electrons directly to photons and emits them in a light beam that doesn't disperse, even when sent over relatively long distances. Further, having a multitude of Proxel elements, can scan images at a great scan rate.

Alternately, a color display may be generated by directing a single light source through a set of mirrored surfaces, variably reflective surfaces, beam splitters or other directional devices to a phase or frequency modulator. The resulting frequency altered beam or beams may be directed to form an image.

While a single light source approach is feasible, the design may include multiple light sources scanning simultaneously to get increased brightness and image stability.

Figure 2:
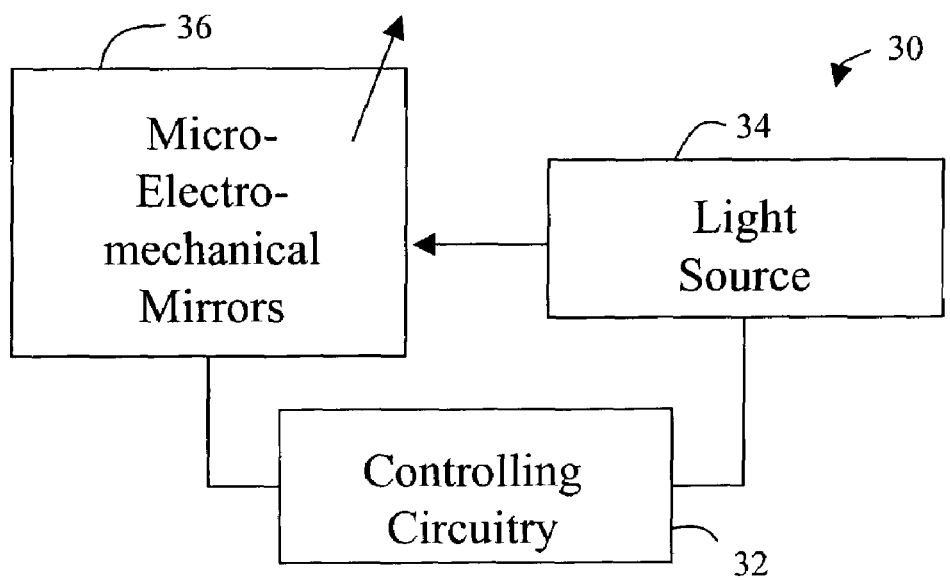
FIGS. 2 and 3 are schematic block diagrams depicting another projection device according to the invention.

FIG. 2 is a schematic block diagram of an exemplary embodiment of a projection system according to the system as seen in FIG. 1. In this embodiment, light sources 32, MEM mirrors 36, and controlling circuitry 34 may all be located on separate substrates or substrate layers. The light sources 32 may be a single light source, a set of light sources, or an array of sources, among others.

Figure 3:
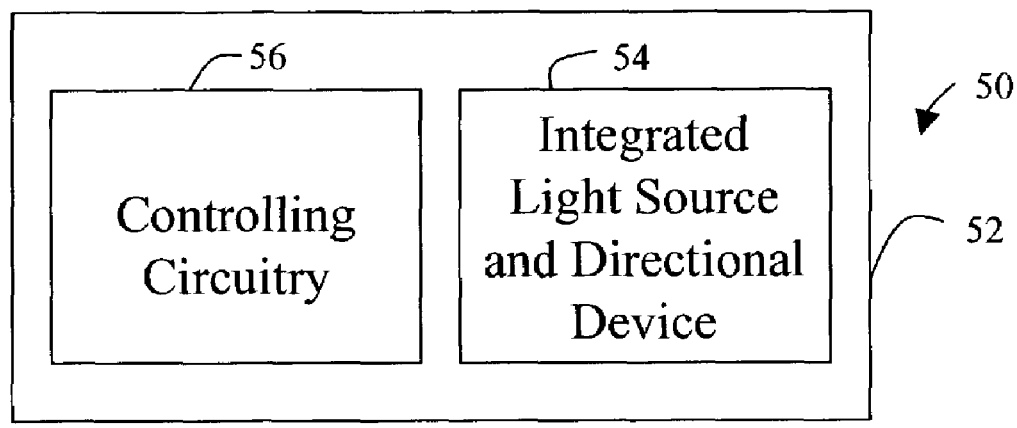

Alternately, the devices may be located on a single substrate. FIG. 3 is a schematic block diagram of an exemplary embodiment of a projection system according to the system as seen in FIG. 1. In this embodiment, the controlling circuitry 56 and integrated light source and directional devices 54 are located on a single substrate. However, other various combinations are possible.

Figure 4:
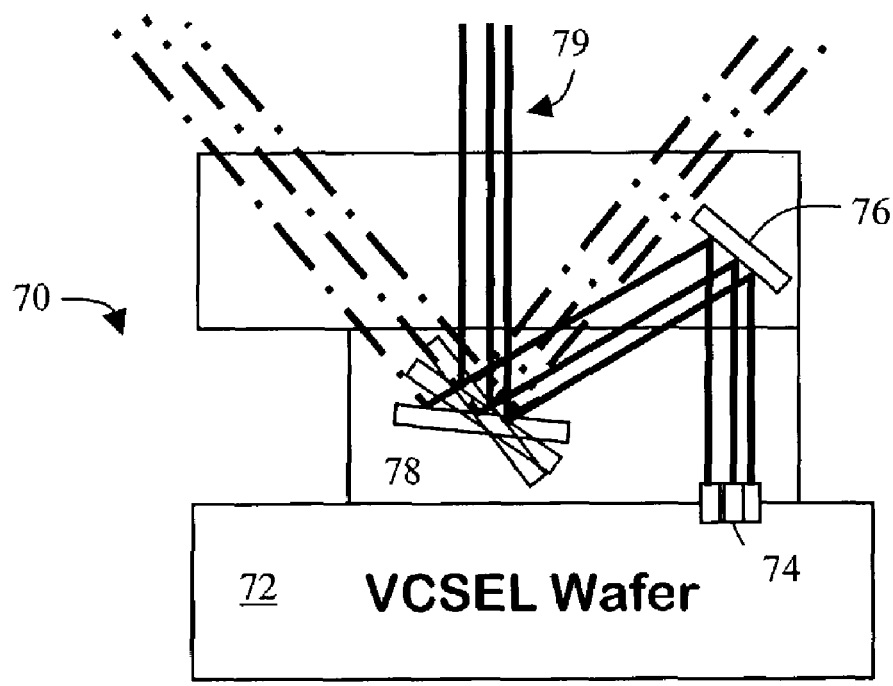
FIG. 4 is a pictorial depicting a proxel for use in the projection device as seen in FIGS. 1, 2 and 3.

FIG. 4 depicts an exemplary embodiment of an integrated light source and light modulator in a proxel element. In this exemplary embodiment, a set of light sources 74 produce light in various wavelengths. This light impinges mirrors 76 and 78 from which it is directed or projected to produce an image. In this case, the collection of light sources and light modulators is termed a proxel. However, various embodiments may be envisaged.

The set of light sources 74 may take various forms including VCSELs, nanodots, edge emitting lasers (EELs), LEDs, RCLEDs, NRC LEDs, surface LEDs, and OLEDs, among others. In the example seen in FIG. 4, a single wafer layer housing a set of VCSELs is overlaid with modulating layers.

The light modulators seen in FIG. 4 include a set of mirrors 76 and 78. These mirrors act to redirect the light 79 in accordance with the requirements to reproduce an image. In an exemplary embodiment, at least one of the mirror is an oscillating mirror. Light projection from the light sources is timed with the path of the one or more oscillating mirrors to illuminate specific points that compose an image.

However, various other modulators may be envisaged. For example, the mirrors may be digital. Alternatively, other modulating devices such as leaver arms, prisms, and angled Pyrex, among others, may be used.

More than one proxel may be arranged on the surface of the integrated device. The number and arrangement of proxels provides for various features such as proxel redundancy, variable aspect ratios, electronic animorphics and panamorphics, masking, reverse scanning, interleaving, gang scanning, and partial gang scanning, among others.

The proxels may be arranged such that their range of projection overlaps with other proxels. In this manner, a set of adjacent proxels may assume the responsibilities of a failed proxel. The proxels may project in a limited region of their range to allow for various features, including zoom, masking and keystone correction, among others. Unlike typical DLP® projectors, an individual proxel is responsible for more than one pixel or an extended path on which various light projections can take place. Typical DLP® projections assign a single digital mirror to a pixel. The mirror projects with an on/off pixel state. As such, many of the above features are not possible.

Figure 5A:
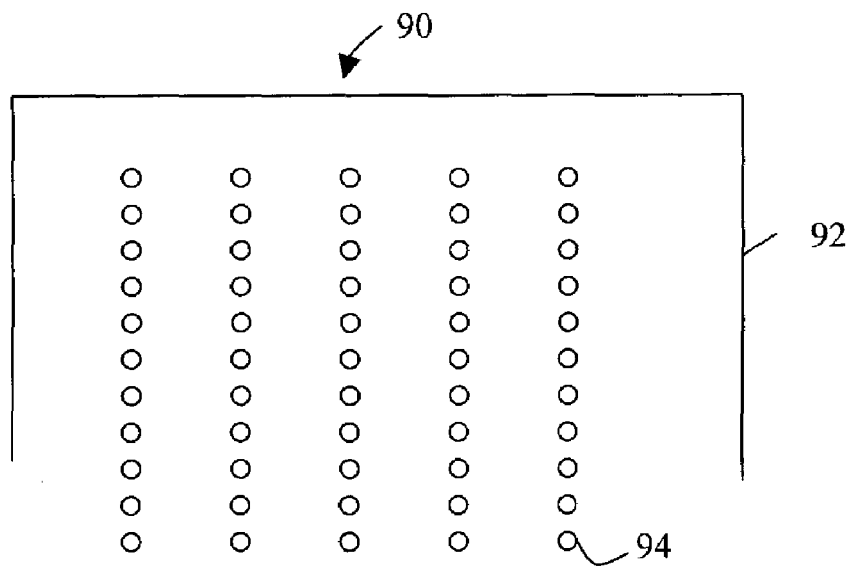
FIGS. 5A, 5B and 5C are diagrams depicting arrangements of proxels within a projection device, according to the invention.

The pattern of the array may also be significant. FIG. 5A depicts an exemplary arrangement or array of proxels 94 on an integrated device surface 92. Each proxel may be uniform in composition or vary by row, column or in some other pattern about the surface of the chip 92. For example, each proxel may have a set of VCSELs projecting visible light and two oscillating mirrors. Alternately, proxels having a single wavelength may be arranged in accordance with their projection. Rows of proxels may be established for Red projecting proxels, blue projecting proxels and green projecting proxels. In another example, proxels projecting differing wavelengths may be arranged in accordance with a pattern.

One aspect of this feature is the reduction of line scanning. Proxels may scan a single line or portion of a single line. A set of proxels may then scan multiple lines simultaneously. In another embodiment, the proxels may scan the same line back and forth or a subsequent line on a reverse scan. On a typical CRT monitor with 800 lines, a beam is scanned across the screen 800 times. The cross scanning is repeated for each horizontal line. In contrast, a device with 800 or more proxels could produce each horizontal line without scanning more than once. Alternately, the proxels could scan vertically and produce each pixel in a horizontal line. As a result, screens could be refreshed faster. Similarly, a device could be used with enough proxels to scan each vertical line without scanning. Moreover, the proxels may scan in both directions. Both the number of proxels and the bi-directional scanning enable interleaving, and very high resolutions.

With a large number of devices, redundancy could also be enabled. The various devices could be adaptively altered to compensate for loss of one or more adjacent devices. The adaptation could be as simple as adjusting the scan range and data allocated to any given proxel through software or hardware switches.

In addition, sensors and other non-visible light source sources could be located with the visible light sources. These could be used to detect the location of objects and movement of objects in the field of view.

Figure 5B:
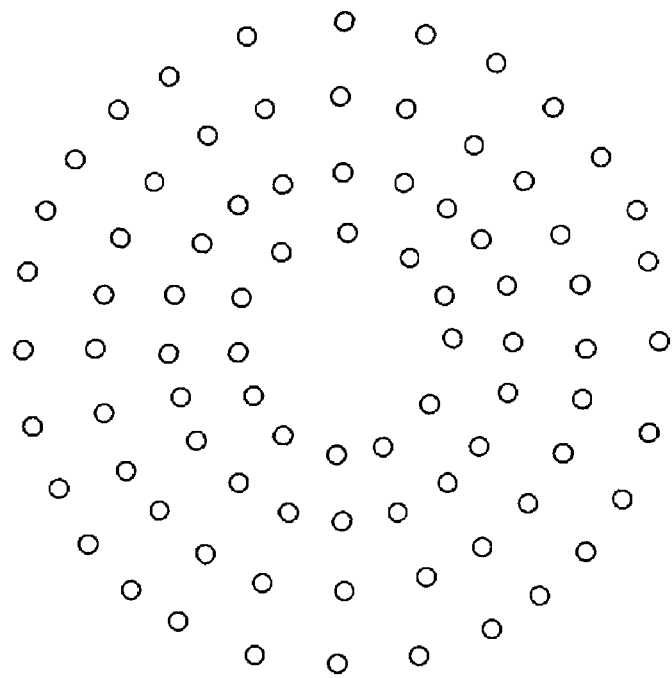
Figure 5C:
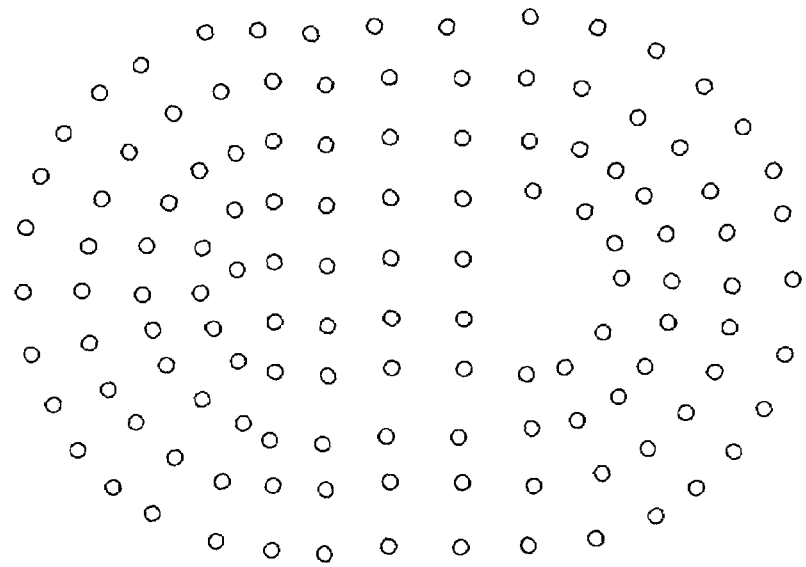

However, various arrangements may be envisaged. FIG. 5B represents a circular or Fresnel-like arrangement. FIG. 5C represents an oval-like arrangement. The proxels may be arranged in various shapes, regular or irregular. Each of these arrangements may produce advantages for specific applications. For example, FIG. 5A may be applied to a portable projector or rear projection television. FIGS. 5B and 5C may be applied to more exotic applications such as display panels, heads-up displays and objects with an uneven surface, among others.

Figure 6A:
FIGS. 6A, 6B, 6C, and 6D are schematic diagrams depicting projected light arrangements, according to the invention.

FIG. 6A represents a scan line arrangement for the proxels with a single oscillating mirror. Light may be projected along a given scan line such as the scan line indicated on top. By timing the activation of a light source, such as a VCSEL, the system may produce the full circles indicated along the top scanning path. However, if the oscillators' full range were to be used, light may be projected on any point along a segment of the top path indicated. The bottom path may represent a second proxel. If multiple proxels are arranged, all lines of an image may be scanned simultaneously.

In a second embodiment, the lower line may represent an alternate path for the first proxel. If an oscillating mirror is associated with a digital mirror having at least two positions, a light source may project at any point along the various paths for any full sweep of the oscillating mirror. If a multitude of such proxels are arranged, a partial gang scan may be accomplished.

Figure 6B:
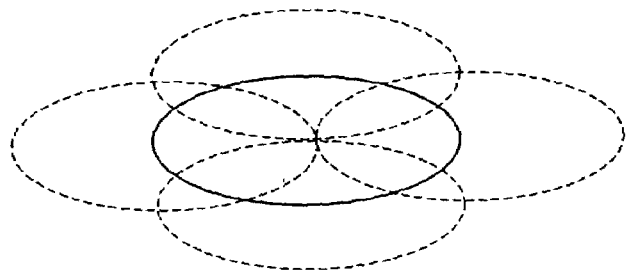

FIG. 6B depicts an alternate embodiment in which various proxels have overlapping ranges. In this manner, if any one proxel were to be disabled or damaged, other proxels in the region could take responsibility for select portions of the proxel's range; providing redundancy. Such an arrangement could also accomplish an electronic zoom feature in which the various adjacent proxels could be assigned ranges within the central proxel's range. The same image data could then be projected in the smaller region or larger region as dictated by the assigned ranges.

Figure 6C:
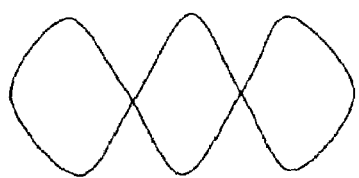

If two oscillating mirrors were used in the modulation, a sinusoidal path may be produced such as that seen in FIG. 6C. The light may be timed to project at any point along the path. If the ratio of the oscillations rates of the two mirrors is indexed greater than one-to-one, various sinusoidal paths may be produced which permit varying coverage of the given region. Such an indexing may be fixed through manufacturing or be varied with a software or hardware parameter or switch.

Figure 6D:
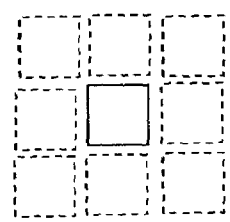

FIG. 6D shows a further potential embodiment of the output from two digital mirrors. If each of the two mirrors have two positions, a set of four pixels may be produced by any given proxel. Alternately, if each of the mirrors has three positions, 9 pixels may be produced by any given proxel. However, various combinations may be envisaged. Such a feature could be further used to provide overlapping or redundancy.

FIG. 7A, 7B, 7C, and 7D further depict the use of proxels to produce various effects or features. For example, FIG. 7A depicts the varying of ranges of the given proxels in a spreading manner. Such control of responsible regions could be used to provide features such as keystone correction, aspect ratio varying, and zoom. FIG. 7B depicts a similar altering of responsible regions in which the responsible regions are compressed or narrowed. This too may produce features such as keystone correction, zoom, aspect ratio variance, among others. FIG. 7C depicts the use of less than all of the available proxels. In this case, a masking may be provided. FIG. 7D depicts the use of one or more proxels to project into the region of a inoperable proxel. As seen by the "x", an inoperable proxel may fail to produce a pixel or scan line. An adjacent proxel may take one the task of both proxels. Alternately, a remote proxel may assume responsibility for the projection region or a combination of proxels may compensate for the loss of the inoperable proxel. With these functionalities, various features may be provided such as varying aspect ratio, supporting multiple aspect ratios, software based keystone correction, animorphics, panamorphics, masking, scanning, interleaving and gang scanning, among others.

In another aspect, the array of devices may act to create a set of diverging, converging, interfering, or additive beams, among others. The set of beams may create additive color arrays. Alternatively, for some applications, the devices may be arranged to create interference patterns. The interference patterns may construct regions of low amplitude and regions of greater amplitude. Further, the device may be arranged to create overlapping patterns. The various patterns may operate in a manner to increase the light intensity at a given location which exceeds the intensity of a single device.

In an alternate embodiment, the proxels may be provided with an electromagnetic energy source that may or may not be visible as exemplified in FIG. 8. A sensing mechanism may be employed to detect objects in the field of view, aspects of the projection surface, and/or objects beyond the projection surface, among others. The source may be used along with the detector situated in the chip 102 to detect objects or the shape or angle of the projection surface. For example, chip 102 may project an image in a visible spectrum and an infrared beam. The infrared beam may, for example, reflect from objects 106 and 108 or screen 104. A detector in 102 may then be used to determine the shape of the objects, the location of objects, the shape of the screen 104 or the angle at which screen 104 resides. Corrections may then be made automatically, changing the range of proxel, scanning data assigned to each proxel, and other characteristics to produce a corrected image. For example, if screen 104 were to be angled into position 112, the chip 102 could automatically correct the projected image to compensate for the new angle and maintain image quality. Proper selection of screen material may also enable detection of objects on the opposite side of the screen such as object 110. In another exemplary embodiment, the proxel modulators may also be used as light collection sources collecting light along a given path with either the light collection scenario or the light projection scenario with detection. A gesture interface may be envisaged.

For example, a LiDAR system may be used to detect screen position, orientation, surface quality, and other parameters. This information may then be used to adapt the focusing, directing, and firing of the light. In addition the system may detect objects in the front of the screen and adaptively project to compensate for distortions. In this manner, the system may have adaptive optics capabilities. The LiDAR system may be built into each proxel, comprises separate proxels, or take another form separate or integrated with the proxel array and chip.

Light detector may also be integrated with each proxel element for determining mirror position, detecting reflected light from a given projection angle, and/or determining operability of proxel light sources. However, various uses may be envisioned.

Figure 9:
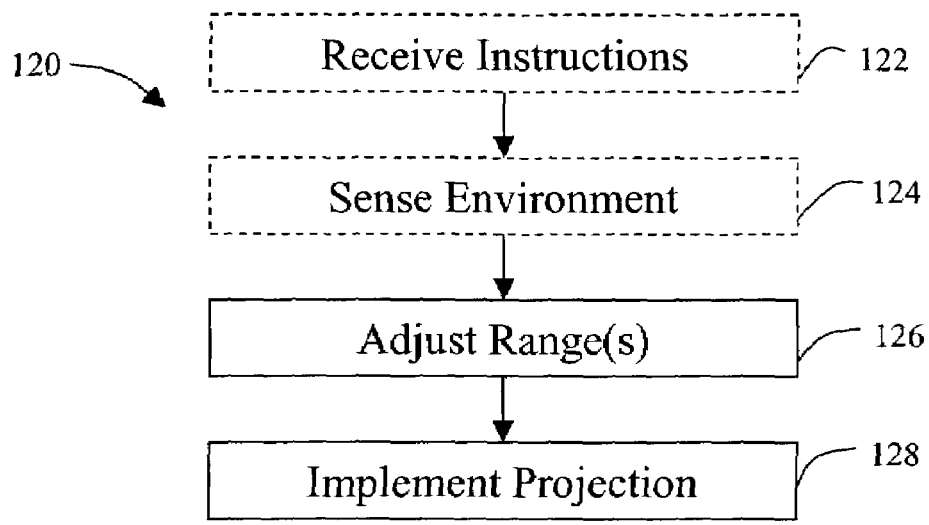
FIG. 9 is block flow diagram depicting an exemplary method for use by the invention as seen in FIGS. 1, 2 and 3.

FIG. 9 depicts an exemplary method for accomplishing the various functionalities possible with a proxel arrangement. The system may or may not receive instructions as indicated by block 122. For example, these instructions could include directions to zoom, change aspect ratio, or adjust for image requirements, among others. The instructions may be provided by a user, a controller, or a feedback mechanism, among others.

The system may also be constructed with sensors and detectors. With these instruments, the system may sense the environment, as seen in block 124. In this case, sensing of projection characteristics such as screen angle, screen shape, the presence of other objects in the light path may be used in conjunction with other instructions to determine a preferred range and allocation of data for each proxel. Through software and/or hardware queues, the range of the proxel may be adjusted to accomplish the desired image feature, as seen a block 126. The image may then be implemented by supplying the select data to the individual proxel control unit as seen in block 128.

Figure 10A:
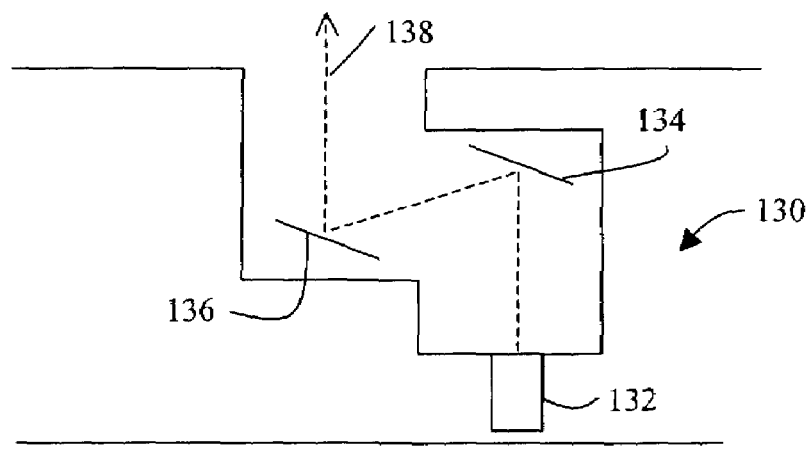
FIGS. 10A, 10B, 10C, and 10D are schematic diagrams depicting exemplary embodiments of a proxel as seen in FIG. 4.
Figure 10B:
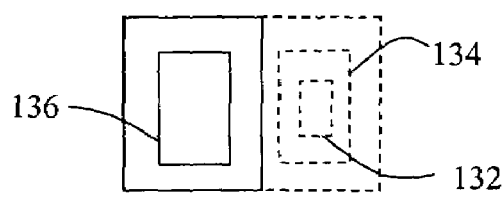
Figure 10C:
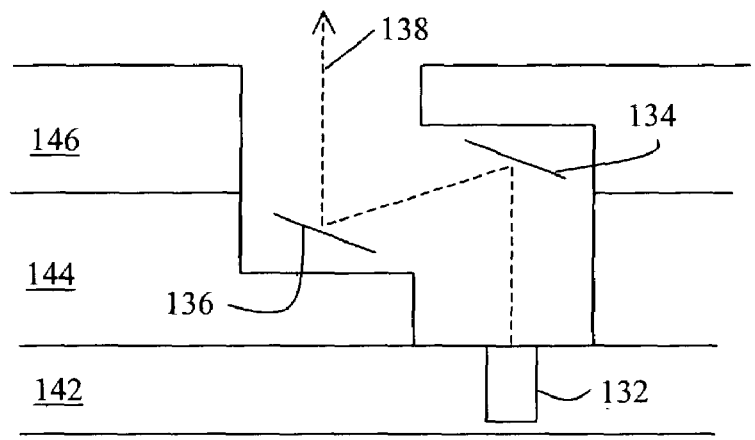

In this manner, various features such as varying aspect ratio, supporting multiple aspect ratios, animorphics, panamorphics, keystone correction, masking, scanning, interleaving, and gang scanning, among others, may be provided. For example, pretesting of the system may determine operability of various proxels and sensing capabilities may aid in determining which proxels are operational. The integrated device may then store the operability information and use this for determining new ranges for proxels to accomplish redundancy among proxels. Alternately, keystone correction may be accomplished by sensing an angle of the screen or the angle of the screen relative to the projection. Adjustments may be made in proxel ranges and the timing of light projection to reduce the foreshortening of the image. Various optical elements may be incorporated with the light source or in the optical path as part of the device with the purpose of focusing or modifying the optical properties of the beam. Also the mirrors may include optical elements and or specific surface shapes or features to accomplish specific optical conditioning or modify the properties of the beam FIGS. 10A, 10B and 10C are exemplary embodiments of a proxel. The proxel system 130 may be developed with one or more light sources 132 and two mirrors 134 and 136. The light sources 132 may project light in time with the oscillations or movements of the mirrors 134 and 136 to produce a projected beam 138. In this exemplary embodiment, the mirrors 134 and 136 may oscillate to produce perpendicular changes in the light direction. For example, mirror 134 may oscillate to produce vertical deviances in the projected beam and mirror 136 may oscillate to produce horizontal deviances in the projected beam 138. However, these may also be reversed.

Alternately, one mirror may be static or stationary. This would reduce the size requirement for the moving mirror. A two axis moving mirror may be used in combination with the static mirror to produce the scanning projection. Further, various combinations of digital and oscillating mirrors may be envisaged.

FIG. 10A is a sideways view of the system 130. The system resides on a common substrate 140. A light source or set of light sources 132 is constructed into the substrate as are the mirrors 134 and 136. Not shown are the appropriate electrical or conductor connections and insulative structures included in the substrate 140. FIG. 10B depicts a view from above the pixel. In one exemplary embodiment, light projected from the light source or set of light sources 132 is modulated up or down by mirror 134 and subsequently reflecting to mirror 136. There, it is modulated side-to-side as seen by FIG. 10B. However, the roles may be reversed. Further, the mirrors may oscillate at differing rates. If these rates are indexed to ratios such as 2:1, 3:1 or other ratios, a sinusoidal curve or various other shapes may be produced. Timed light projection may then produce pixels or lines along this curve. Combinations of these pixels or lines produced by one or more proxels can then be combined to produce an image.

FIG. 10C depicts an alternate embodiment in which the integrated device is composed of various layers 142, 144 and 146. In this alternate embodiment, the light sources 132, along with other electronic circuitry, resides with layer 142. The first mirror 134 resides on layer 146 and the second mirror resides on layer 144. These layers may be interconnected and each layer may have various components of the control circuitry. In combination, the timed light produced by the light sources 132 is modulate by the mirrors 134 and 136 to produce the projected beam 138. The projected beam is then used in combination with other beams to produce the image.

Figure 10D:
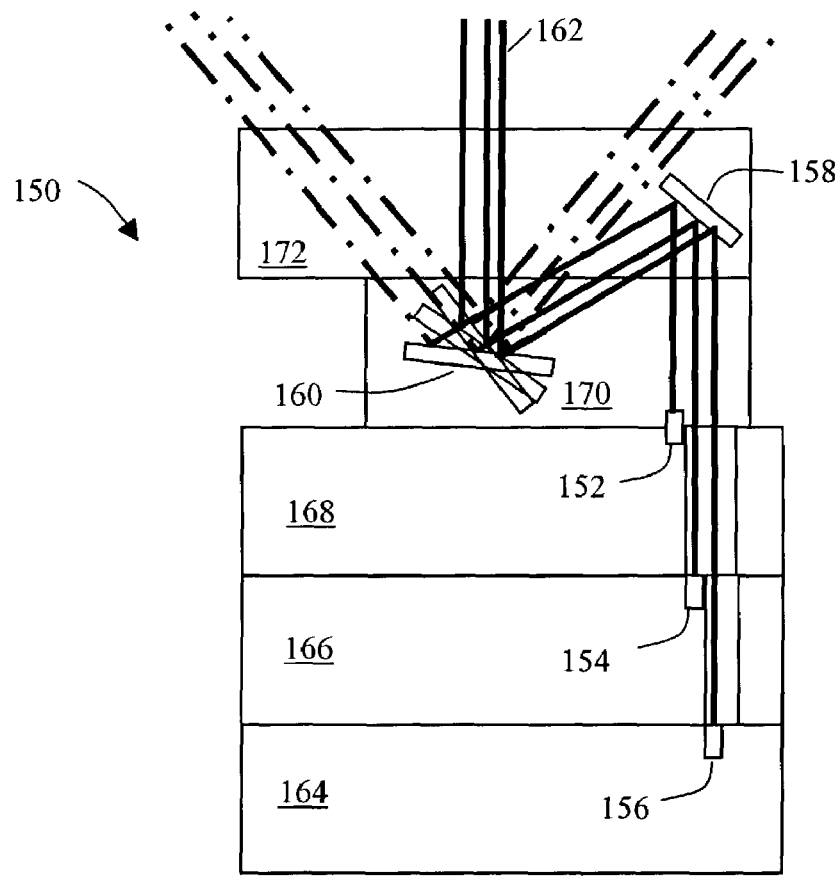

FIG. 10D shows a further embodiment in which a set of light sources are produced on varying wafer layers. Such wafer layers may be used to produce light sources having differing wavelengths. In this exemplary embodiment, light sources 152, 154 and 156 are located separately on layers 168, 166 and 164, respectively. Each of the light sources 152, 154 and 156 have a differing wavelength such as red, blue or green. In conjunction with control circuitry, these light sources 152, 154 and 156 then project, in accordance with the time signal, a beam which is then modulated by mirrors 158 and 160 to produce the modulated beam 162. The modulated beam 162 is used in conjunction with other beams from other proxels to produce an image.

Figure 11:
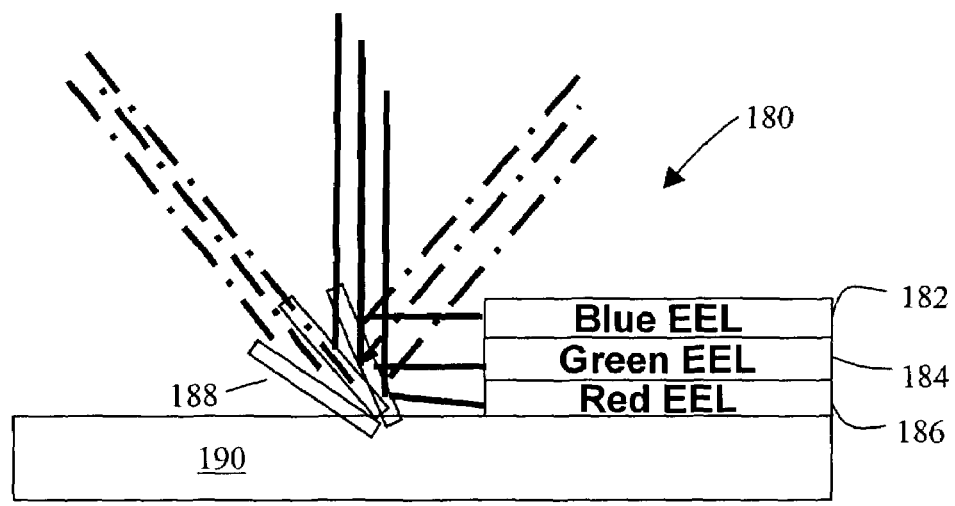
FIG. 11 is another exemplary embodiment of a proxel, as seen in FIG. 4.

An alternate embodiment or a proxel may be seen in FIG. 11. FIG. 11 depicts a set of edge emitting lasers 182, 184, and 186. Each of these edge emitting lasers may have a differing wavelength such as red, blue or green. The lasers may be directed at a mirror 188 or other modulator. The full arrangement may reside on a common substrate 190. However, various light sources and modulating systems may be envisaged.

Figure 12A:
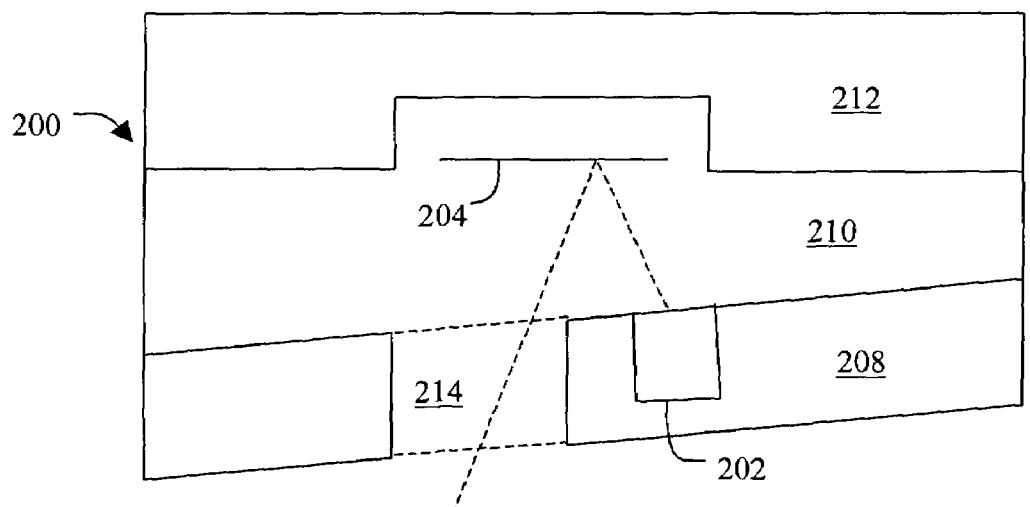
FIGS. 12A, 12B, 12C, and 12D are schematic diagrams depicting further exemplary embodiments of a proxel as seen in FIG. 4.

FIG. 12A shows a further embodiment. In this case, a light source 202 resides in a substrate 208. A mirror 204 resides in a substrate 212. Between the substrates 208 and 212 is a transparent layer 210 such as Pyrex, among others. The transparent layer 210 may be angled. Light produced by the light source 202 impinges the mirror 204 at an angle and is then directed out of an opening 214 in substrate 204 to produce a modulated beam 206.

Figure 12B:
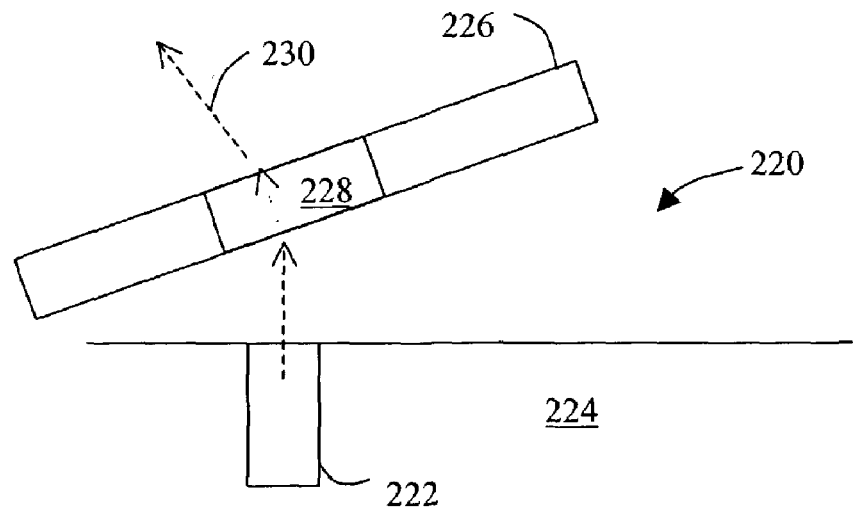
Figure 12C:
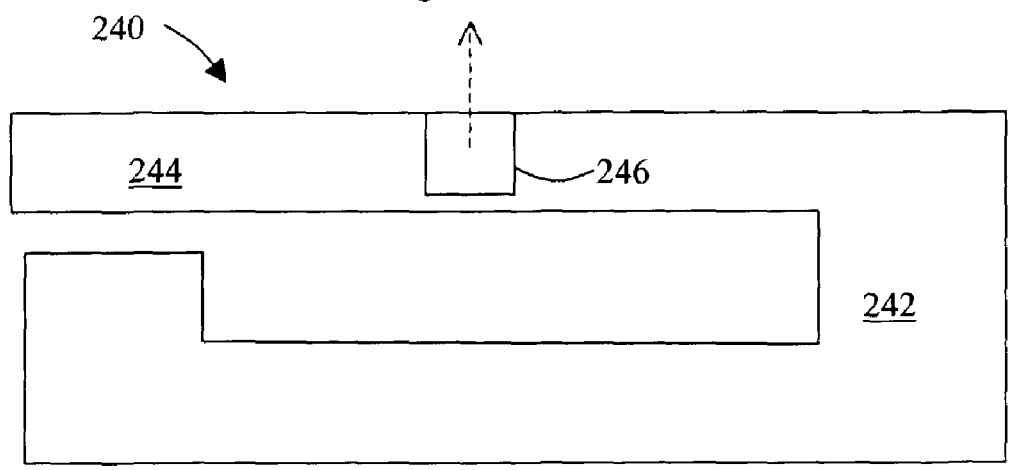

FIG. 12B shows a further exemplary embodiment in which a light source 212 resides in a layer 224. A lever arm 226 having a transmissive light directing element 228 is used to modulate and/or direct the light produced by light source 222 to produce the modulated beam 230. In a further embodiment, FIG. 12C places the light source 226 on the beam 224. Movement of the beam or oscillation of the beam may then be used in conjunction with other modulators to produce the effects described previously. As such, various combinations of beams, digital mirrors, oscillating mirrors and other light modulators may be envisaged.

Figure 12D:
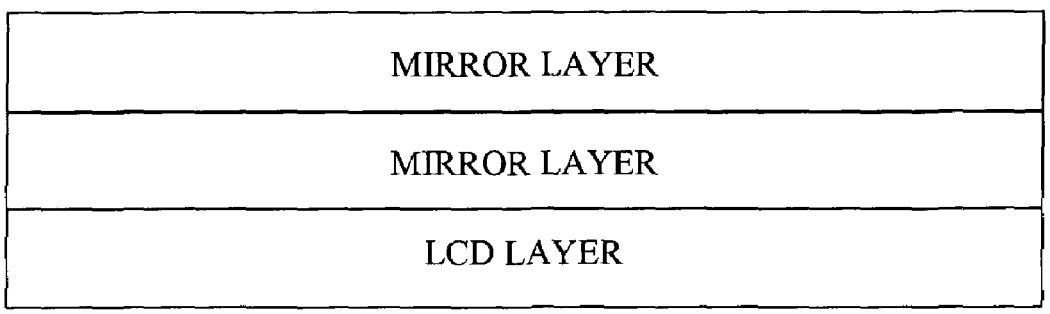

FIG. 12D depicts another embodiment in which an LCD panel layer is integrated with one or more mirror layers. One or more light sources may be filtered or modulated by the LCD layer. The light emitting from the LCD layer may then be scanned using the one or more mirror layers.

Figure 13A:
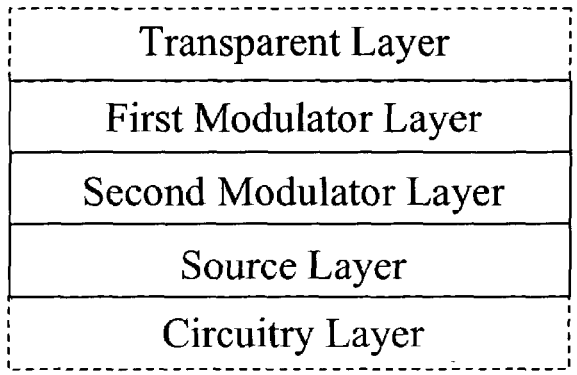
FIGS. 13A, 13B, 13C, 13D and 13E are schematic diagrams depicting exemplary embodiments of a layered projection device as seen in FIGS. 1, 2 and 3.

FIGS. 13A, 13B, 13C, 13D and 13E represent various embodiments of a layered device having integrated light source and modulation means. FIG. 13A is similar to FIG. 10C in that the light source and modulation layers are arranged in a layered fashion as shown. In addition, a transparent layer may be overlaid over the first modulation layer effectively sealing the modulation layers and preventing dust, moisture and other contaminants from damaging or impairing the function of the modulators or light source. Further, a circuitry layer may be coupled below the source layer. Alternatively, the circuitry layer may be integrated with the source layer, first modulator layer or second modulator layer, among others.

Figure 13B:
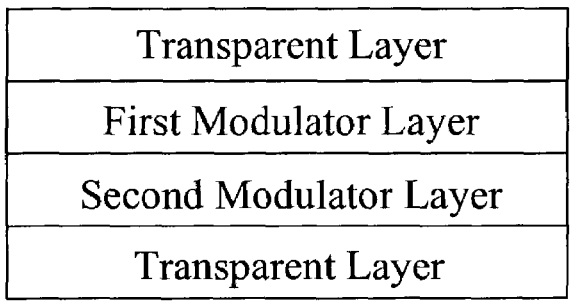
Figure 13C:
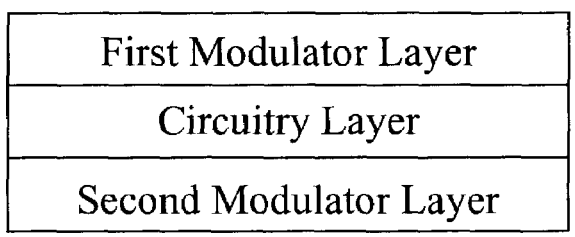

FIG. 13B depicts an exemplary variant of this system in which the first modulator layer and second modulator layer are sealed between two transparent layers. Subsequently circuit layers and source layers may be coupled around this structure. This structure has the advantage that the modulator layers are sealed earlier in the manufacturing process preventing damage and improving yield. FIG. 13C is a further variant in which the circuitry layer is located between the first modulator layer and the second modulator layer. This arrangement has the advantage of maintaining the circuitry layer in closer proximity to the modulator layers. Further, the desired light path between the first and second modulator layers may be greater than two adjacent layers permit. In this case, a third layer, such as the circuitry layer or a transparent layer, placed in between the first and second modulator layers, act to provide greater distance between modulators.

Figure 13D:
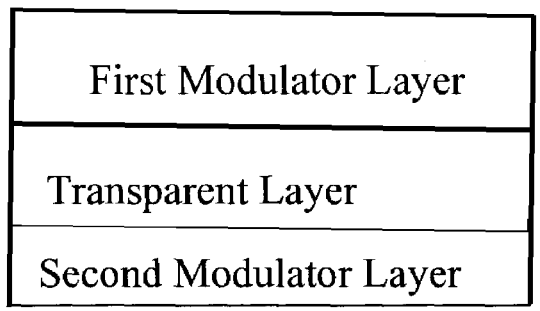
Figure 13E:
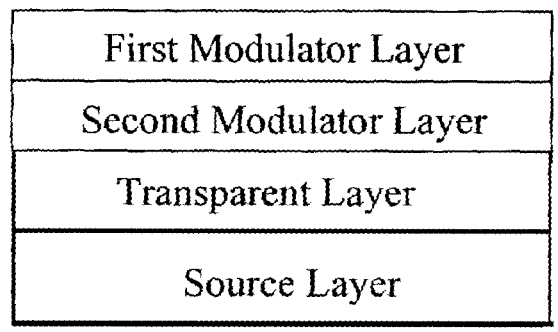

FIGS. 13D and 13E represent the placement of an angled transparent layer within the integrated device. In each of these cases, the angled transparent layer acts to alter the relative angle of light incidence. In the case of mirrored modulators, if the light source is perpendicular to the mirrored surface at rest, the system must consistently bias the mirror to cause the light to reflect to a subsequent mirror. In addition, less than the full range of the mirror is available for modulation of the light. Angling the light incidence functions to increase the range of the proxel. In FIG. 13D, the angled transparent layer or wedge is placed between the first modulator layer and second modulator layer. When light impinges the first modulator layer, it is reflected at an angle to the second modulator layer. When the modulator layers are parallel, the first modulator must work to perform the additional angled movement. However, with the wedge, the full range of the first modulator may be used. FIG. 13E depicts an alternate example in which the transparent layer wedge is placed between the modulator layers and the source layer. In this case, the light incidence on the first modulated layer is again angled relative to the first modulator conserving an amount of range.

Figure 14A:
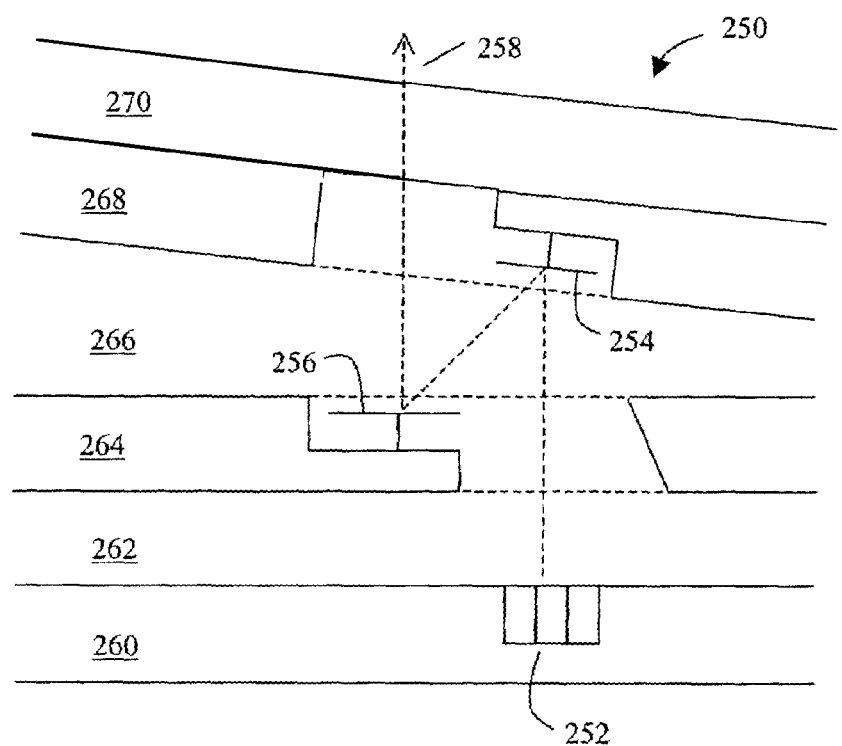
FIGS. 14A, 14B and 14C are schematic diagrams depicting exemplary embodiments of projection devices as seen in FIGS. 13A, 13B, 13C, 13D and 13E.

FIG. 14A depicts a more detailed embodiment of the transparent wedge. In this case, a set of VCSELs 252 reside in a layer 260. The VCSELs produce a timed light signal which impinges mirror 254 and 256 to produce the modulated light 258. The mirrors 254 and 256 may be static mirrors, digital mirrors, single-axis oscillating mirrors, two-axis mirrors, or combinations, among others. In this exemplary embodiment, a transparent wedge 266 made of a material such as Pyrex is placed between the first modulator layer 268 and that of the second modulator 262 with the transparent layer wedge 266. Light from the VCSELs 252 impinges the mirror 254 within automatic incidence angle. As such, the full range of motion of mirror 254 may be used. Further, the circuitry may or may not be placed in a layer 264 and the system may or may not be sealed with a transparent layer 270.

Figure 14B:
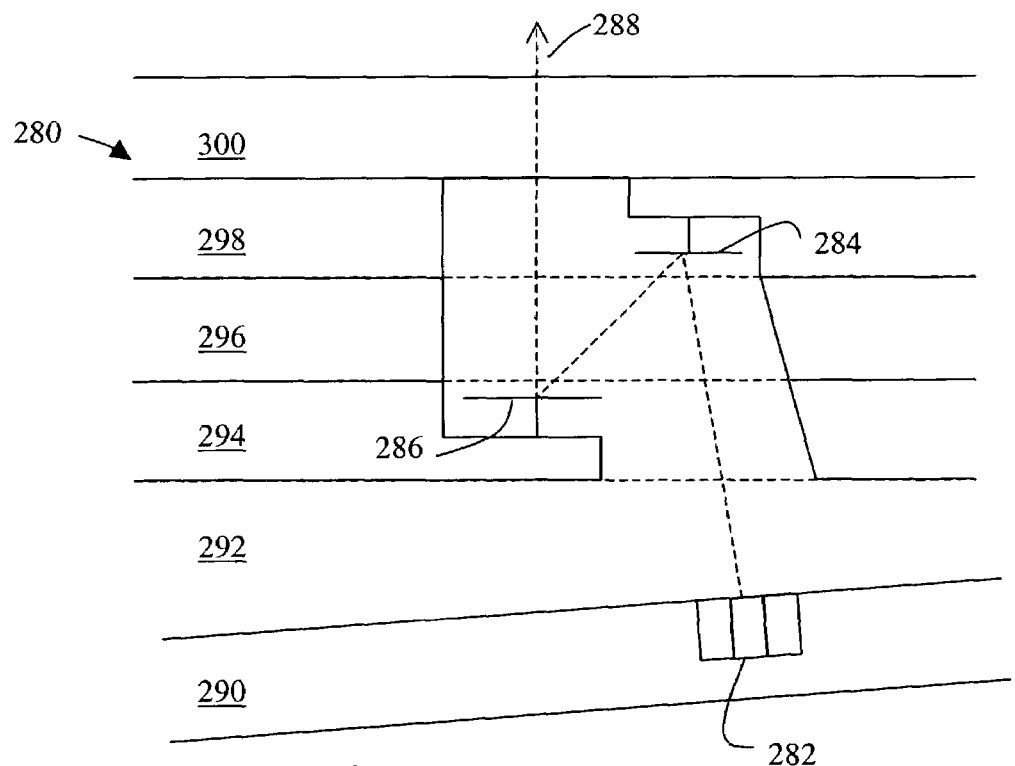

FIG. 14B depicts an alternate embodiment of the system in which the transparent wedge 292 is placed between the source layer 290 and the modulator layers 298 and 294. In this case, light from the VCSELs 282 impinges the mirror 284 with an automatic incidence angle that directs the light toward mirror 286. Mirror 286 then produces the beam 288. Here too, a circuitry layer 296 may be placed between the modulator layers 294 and 298 and a transparent layer 300 may be used to seal the system.

Figure 14C:
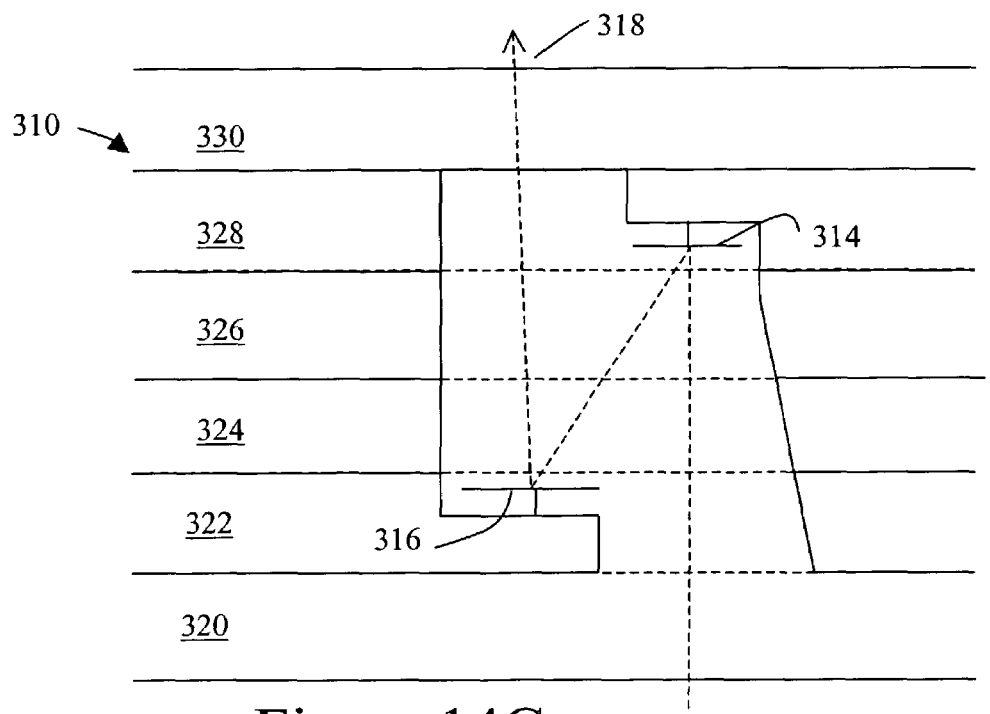

FIG. 14C depicts a further use of transparent layers to effectively seal the modulator layers early in the manufacturing process. In this case, a modulator layer 322 is sealed between transparent layers 320 and 324. Similarly, a modulator layer 328 is sealed between transparent layers 326 and 330. The modulator layers with their associated transparent layers are then superimposed so that a beam 318 may first impinge a modulator 314 and subsequently the modulator 316. In one special case, the modulator layers may comprise the same circuitry design. The two are coupled such that the top modulator layer is upside down and rotated 90 degrees relative to the bottom modulator layer. The layers may then be connected to control circuitries and the integrated light sources. In this manner, a single modulator layer design may be implemented and used twice in each device.

Figure 15:
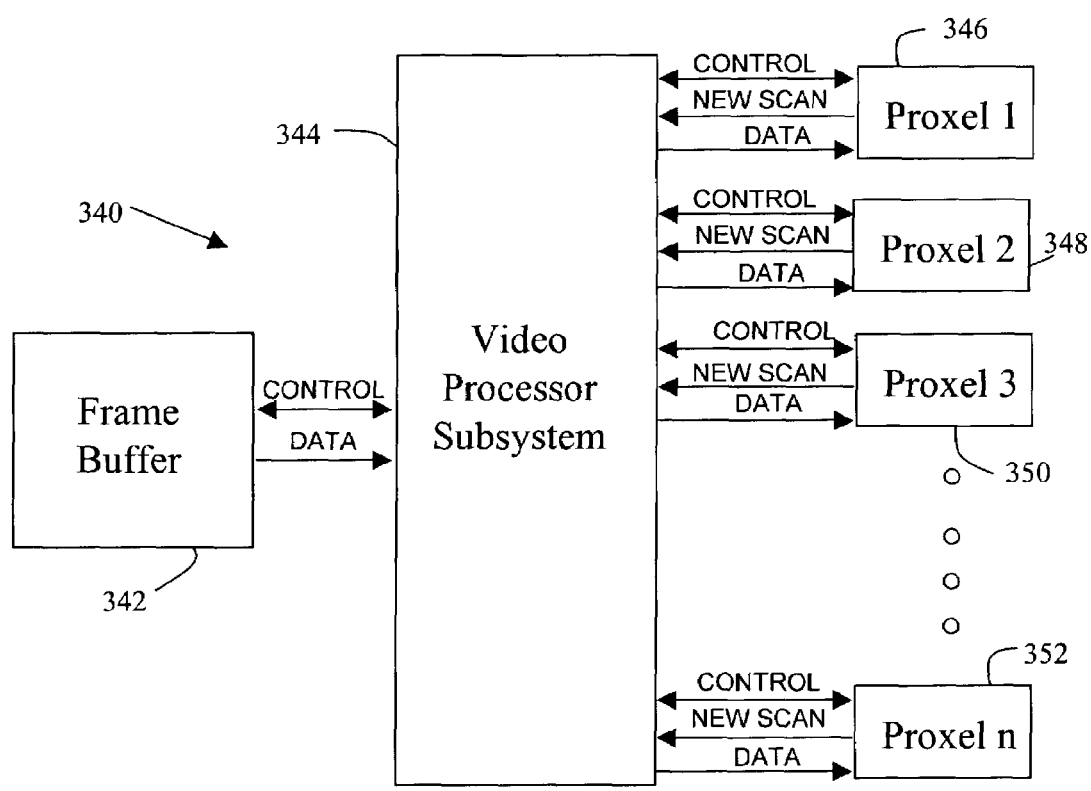
FIGS. 15 and 16 are schematic block diagrams depicting an exemplary embodiment of a circuitry for manipulating the projection device as seen in FIGS. 1, 2 and 3.

FIG. 15 represents an exemplary circuitry for use with the system. The circuitry 340 includes a frame buffer 342, a video processor subsystem 344 and various proxel control units 346, 348, 350 and 352, among others. The frame buffer may act to receive and store video data and/or control data and provide control outputs. The data is provided to the video processor subsystem 344 which interprets the data and control instructions. The video processor subsystem further subdivides instructions and control data and provides data and instructions to the proxel control units 346, 348, 350 and 352, among others. The proxel control units then manipulate the proxel elements to, in combination, produce the image.

The frame buffers 342 may take various forms. These forms may include RAM and various memory circuitries. Alternately, each proxel may have a frame buffer, a separate frame buffer may be used for each wavelength on each proxel, the chip may have a single memory comprising the frame buffer, or various combinations, among others.

The video processor subsystem 344 may take various forms. These forms may include digital signal processors, among others.

Figure 16:
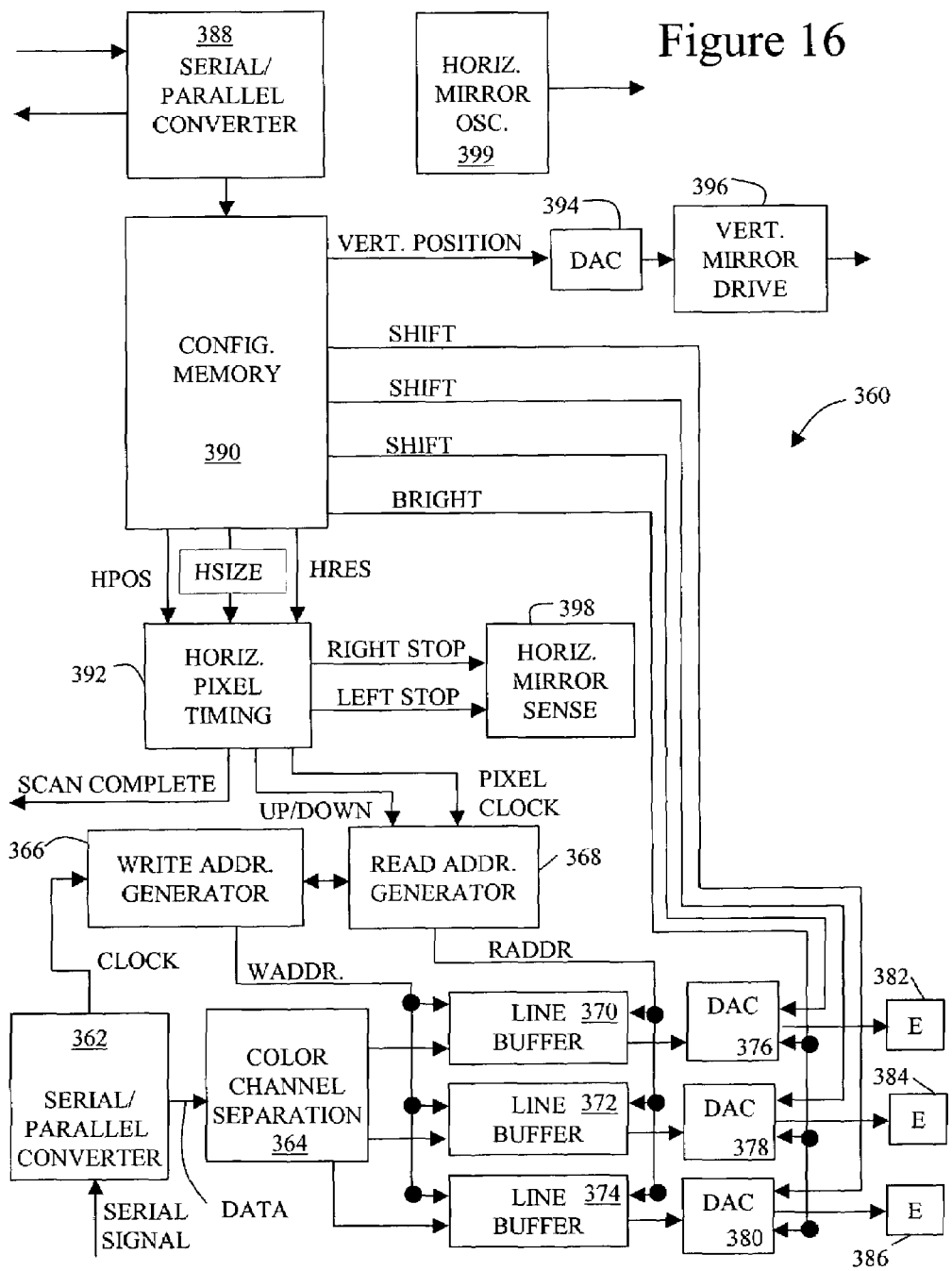

The proxel control units 346, 348, 350 and 352 may take the form exemplified in FIG. 16, among others. FIG. 16 shows a circuitry for controlling proxels. Serial RGB data enters a converter 362. A clock signal derived from the Serial RGB signal is directed to a Write Address Generator 366. The RGB data is directed to a color channel separation circuitry 364. The separated channel signals are directed to their respective line buffers 370, 372, and 374. There, they are stored in accordance with a write address generated by the write address generator 366. The line buffers 370, 372, and 374 are then read in accordance with a read address signal generated by a read address generator 368. The read address signal is determined in accordance with the motion or position of modulation mirrors and a pixel clock. The address may be generated, for example, to produce light pulses in accordance with a motion in one direction. Then, the addresses may be generated to produce light pulses in accordance with an opposite motion. For a horizontal line, the address may be generated so that pixels are produced in accordance with a left to right scan of an image. Then, as the mirror reverses direction, the data may be read in accordance with a right to left scan. In this manner, pixels may be produced for each sweep of the mirror. The write address generator 366 and read address generator 368 may also communicate to ensure proper address handling.

From the line buffers 370, 372, and 374, the RGB data is sent to a corresponding DAC 376, 378, and 380, respectively. The DACs 376, 378, and 380 then produce a signal to activate the associated emitter 382, 384, and 386, respectively. The DACs 376, 378, and 380 may also receive signals associated with brightness. Further, the DACs 376, 378, and 380 may receive a calibration signal associated with each emitter 382, 384, and 386, respectively. The calibration signal may be an offset determined at the time of manufacture to compensate for variability among devices. For example, the device may be tested and a calibrated shift stored in the configuration memory 390 for each proxel and emitter.

In the example of FIG. 16, a red, green, and blue emitter (382, 384, and 386, respectively) are shown. In addition, signals of other wave lengths may be produced. For example, an additional signal may enter a line buffer and DAC associated with an infrared signal.

Serial control data and status data may be communicated between a video processor subsystem and a converter 388. The data may be directed to a configuration memory 390. The configuration memory may store emitter calibration information, brightness information, and parameters associated with the vertical drive and horizontal drive. In this exemplary embodiment, the configuration memory provides parameters associated with the vertical drive to a vertical drive DAC 394. The vertical drive DAC 394 then signals the vertical mirror drive 396. In the case of a digital mirror, the mirror may assume a desired position. In the case of an oscillatory mirror, the mirror may be driven to oscillate with a given frequency indexed to the oscillation or position of a horizontal mirror.

The configuration memory 390 also provides timing in accordance with the oscillation of a horizontal mirror. In this exemplary embodiment, a horizontal mirror driver 399 drive a horizontal oscillating mirror with a know frequency. A mirror sensor 398 senses the position of the mirror. In this example, the mirror sensor 398 produces a signal when the mirror has reached one limit of the range of oscillation. The sensor signals are provided to a pixel timing circuitry 392 which, along with position, size and resolution data, determines the pixel clock signal and direction signal sent to the read address generator 368.

The range of projection, timing of emitter firing and duration of emitter firing can all be varied to produce the desired effect. For example, the RGB data may be emitted over a shorter range of the horizontal oscillation or spread out across the complete range. In this manner, various features are enabled. Signals and data timing may be used to produce varying aspect ratio, multiple aspect ratios, keystone correction, animorphics, panamorphics, masking, scanning, zoom, interleaving, inverted signals, reverse signals, lens shift, and gang scanning, among others.

Figure 17:
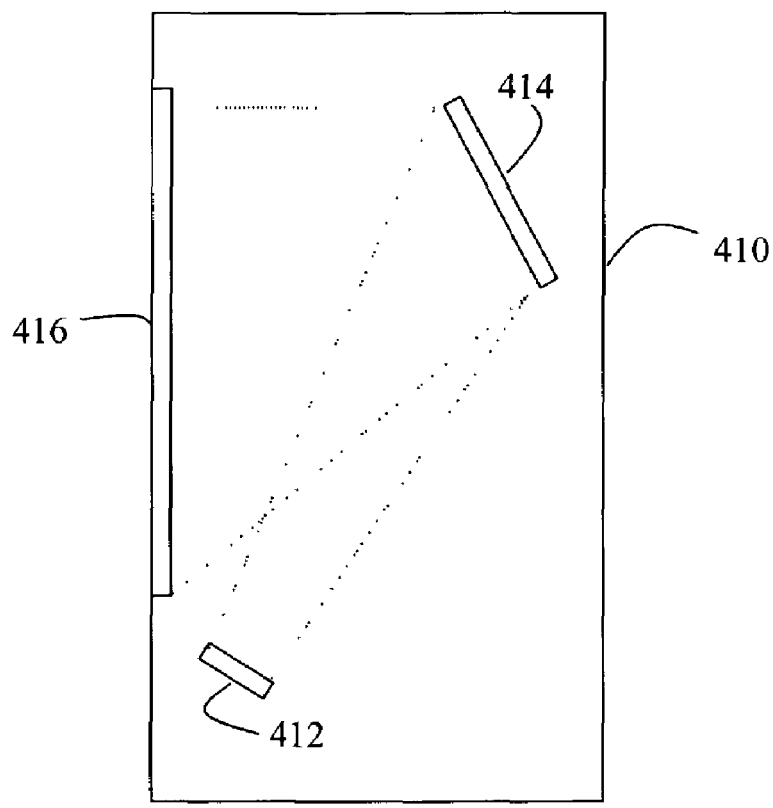

As such, the integrated systems shown in FIGS. 1, 2 and 3 may be used in various applications. FIG. 17 depicts a rear projection television or monitor in which the integrated device 412 projects onto a mirrored surface 414 that subsequently projects onto a screen 416. Alternately, the integrated device 412 may project directly onto the screen 416 or through various optics.

Figure 18:
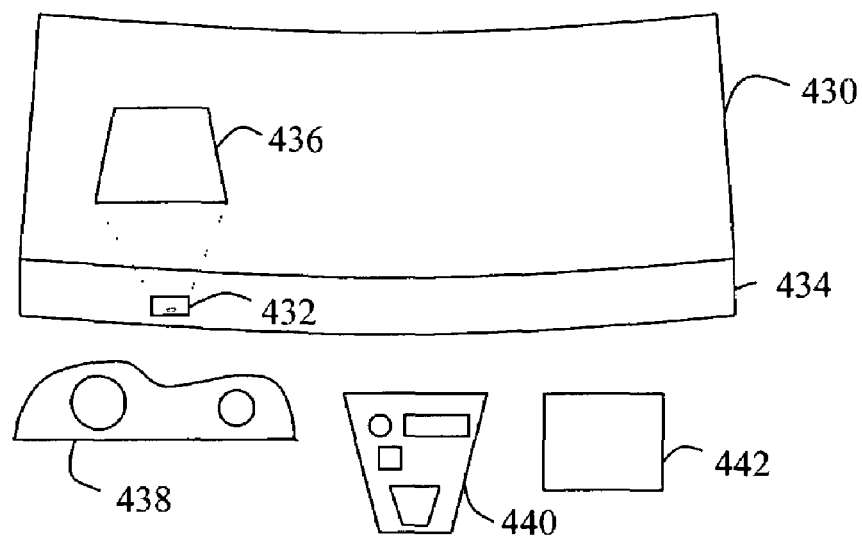

In a further embodiment, FIG. 18 depicts a heads-up display in which an integrated device 432 is situated in a dashboard 434 and projects an image 436 onto a windshield 430. The integrated device 432 or similar devices may be used also to create instrument panels 438 and 440 and travel screen 442. The travel screen may, for example, may be used to show maps or travel directions, a rear view from a vehicle, or any other image data. The heads-up display may be used in an automobile, truck, boat, cruise ship, airplane, and others. The heads-up display may even be projected on windows in buildings and other structures.

The system may be used to provide relevant information to ambient conditions, news, instrument panels, warning indicators, enhanced vision images, air motion, and other information. For example, the system may be used in a car to provide additional seatbelt warnings. Further, the system may be used to overlay night vision images over the vision field to enhance recognition of road hazards for automobiles.

Further, the system may be used to replace instrumentation panels. The system may, for example, project the instrument panel from behind the dash in a rear projector embodiment. Alternatively, the panel may be projected in a front projection manner or various other configurations. In addition, a projector system may be used to project information from a mapping system, a rear view system, climate control systems, audio systems, and other systems. The embodiment may be used for equivalent systems in other vehicles such as boats, airplanes, trucks, and others.

Moreover, the display area may take various shapes. These shapes may be associated with the contour of the instrumentation panels, instruments, windshield, and others. Additionally, the display may function to project images in dynamically changing shapes.

FIGS. 19A, 19B, 19C and 19D depict the integrated device used in an exemplary miniature projection device. The system may be connected to a computer, PDA, or other computing device. Alternatively, the unit may function as a self-contained projection device. The projection device 452 has a popup projector 456 that projects onto objects screen 454. FIG. 19B is an overhead view of the projection 452. The integrated device may be housed in the popup projection 456. This system may or may not have optics 458. FIG. 19C is a side view of the miniature projection 452 near to the popup arm 456 as seen with optics 458. The system may also have input devices including various connectors such as serial ports, parallel ports, USB, fire wire, SCSI, IrDA, smart media, and video input, among others, and drive 462 such as a floppy drive, removable hard drive, smart media reader, CD, or DVD, among others. FIG. 19D depicts a front view of the device 452 with arm 456 and optics 458.

However, the projection may be made on a wall, a window, or other surfaces. Further the device may be configured to project on uneven surfaces, oddly shaped surfaces or angled surfaces. Alternatively, a sensing device such as LiDAR may be used to detect the shape of the surface and control the projection to compensate for the surface.

In another exemplary embodiment, the projection device may be part of a laptop, PDA or other computational device. The projector may project the image, for example, on a laptop screen. In this manner, the flip up display of the laptop may be reduced to a surface application or even be removed. In another example, a PDA may project the display on a wall, a desk, a piece of paper, a hand, glasses, or even the eye.

This projector is capable of adjusting the horizontal and vertical position of the projected image by electronic control of each of the proxels' beam deflections and assigned ranges. This enables a form of automatic keystone correction that is based on the assumption that the projector is positioned orthogonal to the surface being displayed. As the projector's image is adjusted electronically the change of angular deflection of the proxels can be measured and that angular change can be used to calculate a corresponding change in the required keystone correction. This approach can be applied for deflection in the horizontal or vertical direction, or a combination of the two. This enables and automatic correction of the keystone distortion of the image as the image is moved on the plane of the surface on which the image is being projected. Various sensor methods such as tilt sensors, infrared sensors, or feedback from the viewer may also be used.

Figure 20:
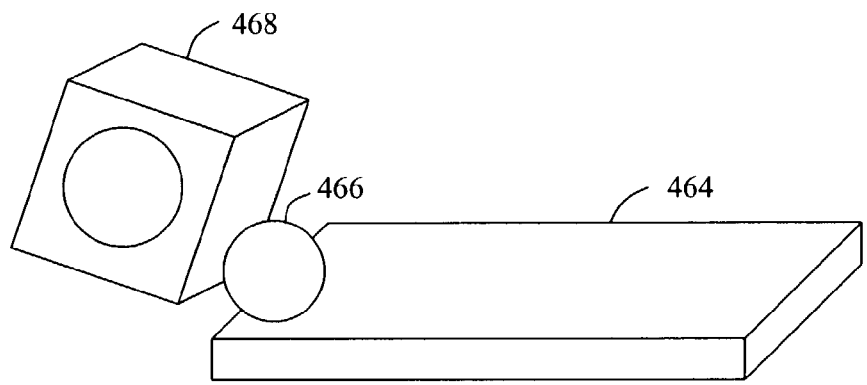

FIG. 20 represents another exemplary embodiment in which a chip or unit based projection system is integrated with a card or insert for a computation device. The projector unit 468 is attached to a joint 466. The joint 466 may permit multi-axis rotation of the projection unit 468. The projection unit 468 is also communicatively coupled to a card 464. This card 464 may take the form of a PCMCIA card, PCI card, or smart card, among others.

Figure 21:
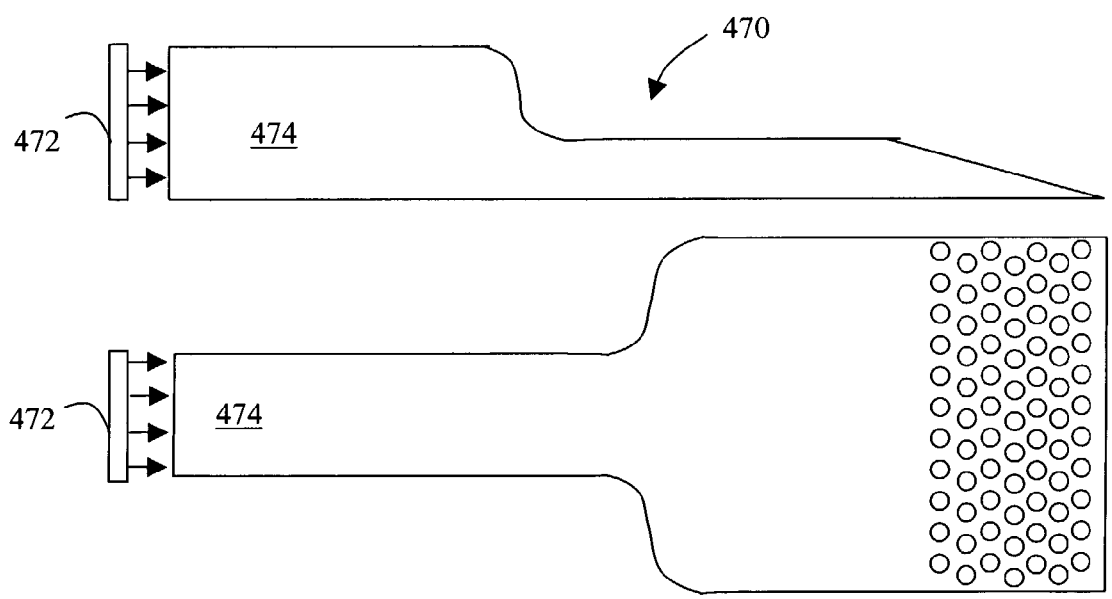

FIG. 21 represents a further exemplary use for the integrated device. The integrated device 472 projects onto a bundled set of fiber optics. The set of fiber optics may be guided or molded into various shapes to produce image surfaces.

Figure 22:
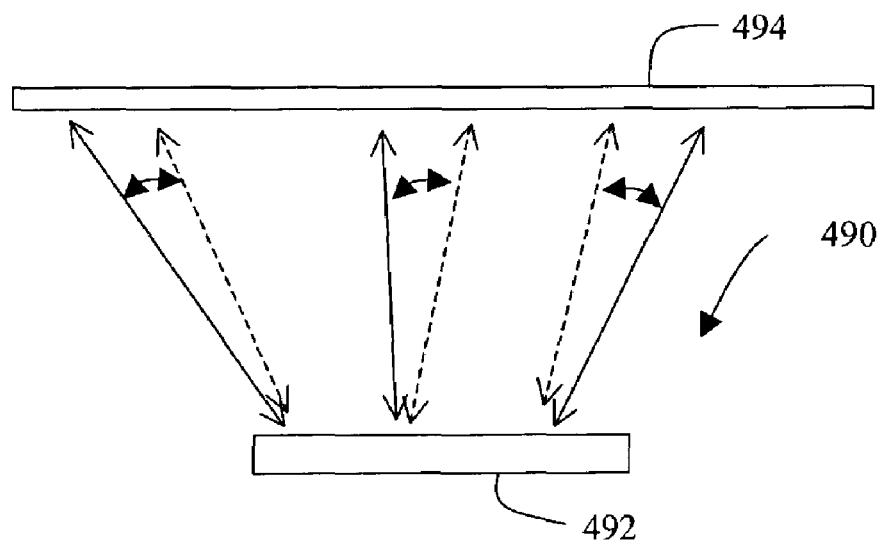

In a further use seen in FIG. 22, an integrated device 492 may project onto a screen 494. The range of motion of the proxels and the timed signal of the light sources may be used to produce an image on the surface 494. Further, detection means either separate or associated with each proxel may be used to determine the shape and angle or position of the screen and adjust the range of motion or range of responsibility for each proxel to compensate accordingly.

Figure 23:
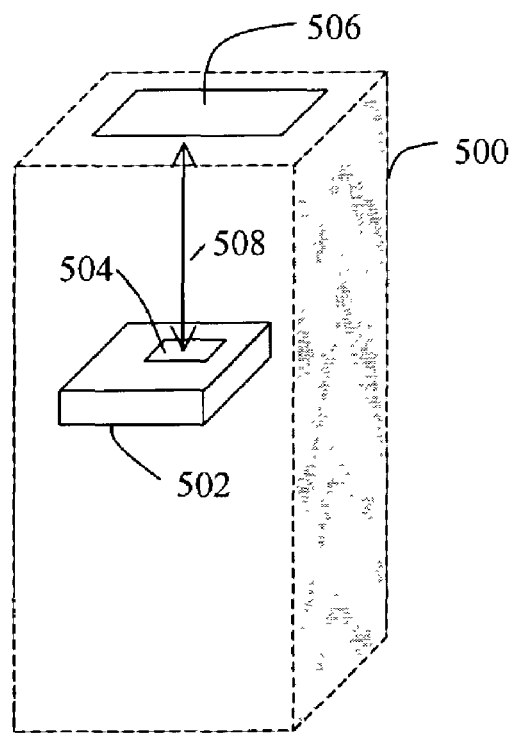

Such a system may also be used for touch screen applications. For example, FIG. 23 depicts a kiosk arrangement. The kiosk 500 has a removable board 502 with the light projection chip 504 and a durable screen 506. Since the touch detection is based on light projected from the chip 504, the screen can be passive and made with a more rugged material.

While suitable for traditional front and rear projection applications, the unique attributes of the light projection device include very small size, low power consumption, and low heat production. These attributes enable a wide range of applications for projection technology that were not previously possible. These applications include both front and rear projection applications. The light projection apparatus can be mounted with a gimbaled joint that allows the projection device to be aimed manually. The light projection apparatus also has a capability to correct the image even when the chip is positioned at a fairly large angle from normal to the screen surface, either left or right, above or below. This flexible positioning capability also further enables a range of unusual applications for the device.

Some of the uniquely enabled applications include:

Rear projection displays with cabinet sizes close to the screen size in the height and width and less than ⅓ the diagonal screen size in depth with an enclosure that can be folded up into a flat package.

Rugged kiosks that use cheaply and easily replaced screens while protecting the active display component in a small enclosure. These are ideal for touch screen applications, as the screen is a rugged and cheap passive device.

Automotive, aeronautic, and marine displays that project their images on a windshield, but are compact enough to sit on the dashboard without complex enclosures. These devices could be implemented as aftermarket devices that plug in to a power source but require no further installation. Applications of this type could function as informational displays for navigation or systems monitoring.

Automotive, aeronautic, and marine displays that project their images on a rear projection screen, replacing current "dashboard" instrumentation with flexible reconfigurable displays.

Embedded applications, where the light projection apparatus is built into a number of electronic devices. This would include camcorders and digital cameras enabling the display of capture video and images for larger groups without external display devices. It could also include embedding in game consoles, handheld electronic toys, specialty tools. In addition, it could also replace LCD panels in portable DVD players or laptops by embedding the projector into same and replacing existing displays with a passive screen.

Embedded into vehicles for information and entertainment displays. The device could be embedded in the overhead or other components of an airplane or other vehicles for the purpose of projecting displays on seatbacks and bulkheads.

Attached to various interface cards such as compact flash, PCMCIA, or others to expand display capabilities of existing devices.

Miniature teleprompters that can easily be positioned on floor or podium without obscuring the view of the speaker.

Dynamic signage—easily positionable with retail environments yet capable of display moving images and refreshable information.

Reconfigurable applications, where the device is converted from use as a heads up display mounted on eyewear to project larger images for groups on a convenient surface or from a personal DVD or game console rear or front projection device to a large screen display.

However, various applications may be envisioned in which the light projection apparatus may be utilized.

As such, a portable display system is described. In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

We claim:

1. An apparatus for projecting an image, the apparatus comprising: a source substrate layer comprising a plurality of sets of light sources, each set of light sources comprising a plurality of light sources, said plurality of light sources producing electromagnetic energy of differing wavelengths; a first modulator substrate layer comprising a plurality of micro-electromechanical mirrors, each micro-electromechanical mirror in said plurality of micro-electromechanical mirrors being associated with a set in the plurality of sets of light sources; a second modulator substrate layer comprising a plurality of micro-electromechanical mirrors, each micro-electromechanical mirror in said plurality of micro-electromechanical mirrors associated with a micro-electromechanical mirror associated with said first modulator substrate layer; a circuitry substrate layer comprising control circuitry, the control circuitry communicatively coupled to said source substrate layer, the first modulator substrate layer, and the second modulator substrate layer; and each substrate layer integrated into a single unit.

2. The apparatus of claim 1, further comprising: at least one transparent layer sealing said first modulator substrate layer and said second modulator substrate layer.

3. The apparatus of claim 1, further comprising: at least one transparent wedge located between said first modulator substrate layer and said second modulator substrate layer.

4. The apparatus of claim 1, further comprising: a transparent wedge layer associated with said source substrate layer.

5. The apparatus of claim 1, wherein said differing wavelengths comprise wavelengths associated with red, blue, and green.

6. The apparatus of claim 1, wherein said differing wavelengths comprise wavelengths associated with infrared.

7. The apparatus of claim 1, further comprising: a plurality of electromagnetic energy detectors.

* * * * *